US010420156B2

(12) United States Patent
Shinozaki et al.

(10) Patent No.: US 10,420,156 B2
(45) Date of Patent: Sep. 17, 2019

(54) WIRELESS COMMUNICATION TERMINAL, WIRELESS COMMUNICATION SYSTEM, WIRELESS COMMUNICATION METHOD, AND NON-TRANSITORY MEDIUM SAVING PROGRAM

(71) Applicant: Olympus Corporation, Hachioji-shi, Tokyo (JP)

(72) Inventors: Arata Shinozaki, Tokyo (JP); Kensuke Ishii, Tokyo (JP); Saori Matsumoto, Tokyo (JP); Takayuki Nakatomi, Tokyo (JP); Yoshitaka Sato, Tokyo (JP)

(73) Assignee: Olympus Corporation, Tokyo (JP)

( * ) Notice: Subject to any disclaimer, the term of this patent is extended or adjusted under 35 U.S.C. 154(b) by 106 days.

(21) Appl. No.: 15/818,675

(22) Filed: Nov. 20, 2017

(65) Prior Publication Data
US 2018/0139792 A1 May 17, 2018

Related U.S. Application Data

(63) Continuation of application No. PCT/JP2015/064883, filed on May 25, 2015.

(51) Int. Cl.
*H04L 29/06* (2006.01)
*H04W 76/11* (2018.01)
(Continued)

(52) U.S. Cl.
CPC ............ *H04W 76/11* (2018.02); *H04L 69/18* (2013.01); *H04W 4/00* (2013.01); *H04W 12/08* (2013.01);
(Continued)

(58) Field of Classification Search
CPC . H04W 76/11; H04W 76/27; H04W 52/0216; H04W 4/00; H04W 12/08; H04W 84/18; H04L 69/18
See application file for complete search history.

(56) References Cited

U.S. PATENT DOCUMENTS

| | | | |
|---|---|---|---|
| 2013/0137373 A1* | 5/2013 | Choi | H04B 5/0031 455/41.1 |
| 2014/0024310 A1 | 1/2014 | Dua | |

(Continued)

FOREIGN PATENT DOCUMENTS

| | | |
|---|---|---|
| JP | 2006-197071 | 7/2006 |
| JP | 2008-109592 | 5/2008 |

(Continued)

OTHER PUBLICATIONS

International Search Report ("ISR") to corresponding International Application No. PCT/JP2015/064883, dated Aug. 11, 2015 (2 pgs.), with translation (2 pgs.).

(Continued)

*Primary Examiner* — Hashim S Bhatti
(74) *Attorney, Agent, or Firm* — John C. Pokotylo; Pokotylo Patent Services

(57) ABSTRACT

A wireless communication terminal includes a first communication module performing wireless communication with an external terminal by using a first communication protocol; a second communication module performing wireless communication with the external terminal by using a second communication protocol; and a generation unit, wherein when the first communication module receives a connection request and terminal-specifying information specifying the external terminal, the generation unit generates a network identifier used for identifying a network using the second communication protocol based on the terminal-specifying information, the generation unit causes the second communication module to establish a logical link of communication with the external terminal by using the network identifier, and the generation unit subsequently causes the second communication module to start the network based on the network identifier such that the network is in a communi- (Continued)

cable state for the external terminal on a higher layer than a layer of the logical link.

17 Claims, 20 Drawing Sheets

(51) Int. Cl.
*H04W 4/00* (2018.01)
*H04W 12/08* (2009.01)
*H04W 76/27* (2018.01)
*H04W 52/02* (2009.01)
*H04W 84/18* (2009.01)
*H04W 88/06* (2009.01)

(52) U.S. Cl.
CPC ....... *H04W 52/0216* (2013.01); *H04W 76/27* (2018.02); *H04W 84/18* (2013.01); *H04W 88/06* (2013.01); *Y02D 70/00* (2018.01); *Y02D 70/142* (2018.01); *Y02D 70/144* (2018.01); *Y02D 70/166* (2018.01)

(56) References Cited

U.S. PATENT DOCUMENTS

| | | | |
|---|---|---|---|
| 2015/0018037 A1 | 1/2015 | Kawakami et al. | |
| 2015/0078283 A1* | 3/2015 | Nakamura, Jr. | H04W 76/14 |
| | | | 370/329 |
| 2015/0120869 A1* | 4/2015 | Watanabe | H04L 67/06 |
| | | | 709/217 |
| 2016/0219050 A1* | 7/2016 | Zou | H04L 63/0869 |
| 2017/0290071 A1* | 10/2017 | Ito | H04W 76/14 |

FOREIGN PATENT DOCUMENTS

| | | |
|---|---|---|
| JP | 2013-115828 | 6/2013 |
| JP | 2015-088788 | 5/2015 |
| WO | WO 2013/136876 | 9/2013 |

OTHER PUBLICATIONS

Notice of Allowance to corresponding Japanese Application No. 2017-520088, dated Jan. 8, 2019 (3 pgs.), with translation (3 pgs.).

* cited by examiner

FIG. 3

| COMMAND | REQUEST_CONNECTION (CONNECTION REQUEST) |
|---|---|
| TERMINAL-SPECIFYING INFORMATION | 12:34:56:78:9A:BC (MAC ADDRESS) |

FIG. 8

| COMMAND | CHANGE_PASSWD (PASSWORD CHANGE REQUEST) |
|---|---|
| OLD PASSWORD | f43e70c1f4 |
| NEW PASSWORD | 85d502106a |

FIG. 11

| COMMAND | SET_NETWORK_NAME (NETWORK NAME SETTING) |
|---|---|
| NETWORK NAME | mycam483 |

FIG. 15

| COMMAND | REQUEST_CONNECTION (CONNECTION REQUEST) |
|---|---|
| TERMINAL-SPECIFYING INFORMATION | 12:34:56:78:9A:BC (MAC ADDRESS) |
| TERMINAL NAME | PHONE1 |

| COMMAND | NOTIFY_STATUS (COMMUNICATION STATUS NOTIFICATION) |
|---|---|
| COMMUNICATION MODULE NAME | MODULE2 |
| COMMUNICATION STATUS | CONNECTED (IN MIDDLE OF CONNECTION) |
| COMMUNICATION PARTNER | PHONE1 |

| RESPONSE | TRY_AGAIN (RE-TRANSMISSION REQUEST) |
|---|---|
| RE-TRANSMISSION INTERVAL [sec] | 30 |

WIRELESS COMMUNICATION TERMINAL, WIRELESS COMMUNICATION SYSTEM, WIRELESS COMMUNICATION METHOD, AND NON-TRANSITORY MEDIUM SAVING PROGRAM

This application is a continuation application based on a PCT International Application No. PCT/JP2015/064883, filed on May 25, 2015. The content of the PCT International Application is incorporated herein by reference.

BACKGROUND OF THE INVENTION

Field of the Invention

The present invention relates to a wireless communication terminal, a wireless communication system, a wireless communication method, and a non-transitory medium saving program.

Description of Related Art

Wireless communication systems performing communication, for example, transmission of video data or the like between a wireless communication terminal such as an imaging terminal provided with a wireless communication function and an external terminal such as a smartphone are well known (for example, see Japanese Unexamined Patent Application, First Publication No. 2006-197071).

SUMMARY OF THE INVENTION

According to a first aspect of the present invention, a wireless communication terminal includes a first communication module performing wireless communication with an external terminal by using a first communication protocol; a second communication module performing wireless communication with the external terminal by using a second communication protocol; and a generation unit, wherein in a situation in which the first communication module receives a connection request requesting a connection and terminal-specifying information specifying the external terminal from the external terminal by using the first communication protocol, the generation unit generates a network identifier based on the terminal-specifying information, the network identifier being used for identifying a network using the second communication protocol, the generation unit causes the second communication module to establish a logical link of communication with the external terminal by using the network identifier, and the generation unit subsequently causes the second communication module to start the network based on the network identifier such that the network is in a communicable state for the external terminal on a higher layer than a layer in which the logical link of the communication is established.

According to a second aspect of the present invention, in the wireless communication terminal according to the first aspect, the generation unit may cause the first communication module to transmit the generated network identifier to the external terminal by using the first communication protocol.

According to a third aspect of the present invention, in the wireless communication terminal according to the first aspect or the second aspect, the generation unit may generate a password used for a connection to the network while generating the network identifier, and the generation unit may cause the first communication module to transmit the network identifier and the password to the external terminal by using the first communication protocol.

According to a fourth aspect of the present invention, in the wireless communication terminal according to one of the first to third aspects, the generation unit may suspend a start-up of the network by the second communication module during a period from a time power is supplied to the wireless communication terminal until the first communication module receives the connection request.

According to a fifth aspect of the present invention, in the wireless communication terminal according to one of the first to fourth aspects, before the first communication module receives the terminal-specifying information, the generation unit may cause the second communication module to start the network based on the network identifier that is generated based on the previously received terminal-specifying information.

According to a sixth aspect of the present invention, in the wireless communication terminal according to one of the first to fifth aspects, the generation unit may generate the network identifier based on the terminal-specifying information and own apparatus-specifying information used for specifying the wireless communication terminal.

According to a seventh aspect of the present invention, the wireless communication terminal according to one of the first to sixth aspects may furtherly include a storage unit storing first authentication information used for authenticating the external terminal, and the generation unit may determine whether or not to start the network based on the first authentication information stored in the storage unit and second authentication information received from the external terminal by the first communication module.

According to an eighth aspect of the present invention, in the wireless communication terminal according to one of the first to seventh aspects, the first communication protocol may be a communication protocol capable of being applied to one-to-many communication connections, and the second communication protocol may be a communication protocol only capable of being applied to a one-to-one communication connection.

According to a ninth aspect of the present invention, in the wireless communication terminal according to one of the first to eighth aspects, the external terminals may include a first external terminal and a second external terminal different from the first external terminal, and in a situation in which the first communication module receives a connection request and first terminal-specifying information specifying the first external terminal from the first external terminal, the generation unit may generate a first network identifier based on the first terminal-specifying information, the first network identifier being used for identifying a first network using the second communication protocol, the generation unit may cause the second communication module to establish a logical link of communication with the first external terminal by using the first network identifier, and the generation unit may subsequently cause the second communication module to start the first network based on the first network identifier such that the first network is in a communicable state for the first external terminal on a higher layer than a layer in which the logical link of the communication is established, while the generation unit causing the first communication module to transmit the first network identifier to the first external terminal by using the first communication protocol, and wherein in a situation in which the first communication module receives the connection request and second terminal-specifying information specifying the second external terminal from the second external terminal, the generation unit may generate a second network identifier based on the second terminal-specifying information, the second network identifier being different from the first network identifier, and the second network identifier being used for identifying a second network using the second communication protocol, the generation unit may cause the second communication module to establish a logical link of communication with the second external terminal by using the second network identifier, and the generation unit may subsequently cause the second communication module to start the second network based on the second network identifier such that the second network is in a communicable state for the second external terminal on a higher layer than a layer in which the logical link of the communication is established, while the generation unit causing the first communication module to transmit the second network identifier to the second external terminal by using the first communication protocol.

According to a tenth aspect of the present invention, in the wireless communication terminal according to the ninth aspect, after the second communication module starts the first network and in a situation in which the first communication module receives the connection request and the second terminal-specifying information from the second external terminal, the second communication module may suspend the first network and the second communication module starts the second network.

According to an eleventh aspect of the present invention, in the wireless communication terminal according to the ninth aspect, after the second communication module starts the first network and in a situation in which the first communication module receives the connection request and the second terminal-specifying information from the second external terminal, the second communication module may suspend the first network in response to a suspend request for the first network from the first external terminal, and the second communication module may subsequently start the second network.

According to a twelfth aspect of the present invention, in the wireless communication terminal according to the ninth aspect, after the second communication module starts the first network and in a situation in which the first communication module receives a connection request and the second terminal-specifying information from the second external terminal, the second communication module may transmit a suspend request for the first network to the first external terminal, and the second communication module may subsequently suspend the first network based on a determination result regarding whether the suspend request is applicable, the determination result being received from the first external terminal.

According to a thirteenth aspect of the present invention, in the wireless communication terminal according to the ninth aspect or the eleventh aspect, after the generation unit causes the second communication module to start the first network and in a case in which the first communication module receives a connection request and the second terminal-specifying information from the second external terminal, the generation unit may notify the second external terminal of information representing that the first network has been started.

According to a fourteenth aspect of the present invention, in the wireless communication terminal according to the thirteenth aspect, the information representing that the first network has been started may include identification information used for identifying the first external terminal.

According to a fifteenth aspect of the present invention, a wireless communication system includes: the wireless communication terminal according to any one of the first to fourteenth aspects; and an external terminal transmitting a connection request and terminal-specifying information to the wireless communication terminal by using a first communication protocol, the external terminal connecting to the network started by the wireless communication terminal based on the network identifier.

According to a sixteenth aspect of the present invention, a wireless communication method between a wireless communication terminal and an external terminal is provided, wherein the wireless communication terminal includes a first communication module and a second communication module, the first communication module performs wireless communication with the external terminal by using a first communication protocol, and the second communication module performs wireless communication with the external terminal by using a second communication protocol. The wireless communication method includes a transmitting step of transmitting a connection request requesting a connection and terminal-specifying information specifying the external terminal to the wireless communication terminal according to the first communication protocol, the transmitting step being performed by the external terminal; generating step of generating a network identifier used for identifying a network using the second communication protocol based on terminal-specifying information, in a situation in which the wireless communication terminal receives the connection request and the terminal-specifying information from the external terminal via the first communication module by using the first communication protocol, the connection request and the terminal-specifying information being transmitted during the transmitting step, and the generating step being performed by the wireless communication terminal; a start-up step of causing the second communication module to establish a logical link of communication with the external terminal by using the network identifier generated in the generating step and subsequently causing the second communication module to start the network based on the network identifier such that the network is in a communicable state for the external terminal on a higher layer than a layer in which the logical link of the communication is established, the start-up step being performed by the wireless communication terminal; and a connecting step of connecting the external terminal to the network based on the network identifier by using the second communication protocol, the connecting step being performed by the external terminal.

According to a seventeenth aspect of the present invention, a non-transitory medium saving program causing a computer as a wireless communication terminal is provided, wherein the computer as the wireless communication terminal includes a first communication module performing wireless communication with an external terminal by using a first communication protocol and a second communication module performing wireless communication with an external terminal by using a second communication protocol. The program is provided to cause the computer to execute a generating step of generating a network identifier used for identifying a network using the second communication protocol based on terminal-specifying information, in a situation in which the first communication module receives a connection request requesting a connection and terminal-specifying information used for specifying an external terminal from the external terminal by using the first communication protocol; and a start-up step of causing the second communication module to establish a logical link of communication with the external terminal by using the network identifier, which is generated in the generation of a network identifier, and subsequently staring the network based on the network identifier on a higher layer than a layer in which the logical link of the communication is established such that network is in a communicable state for the external terminal.

BRIEF DESCRIPTION OF DRAWINGS

FIG. 3 is a diagram illustrating an example of data of a connection request and terminal-specifying information according to the first embodiment.

FIG. 8 is a diagram illustrating an example of data of a password change request according to the third embodiment.

FIG. 11 is a diagram illustrating an example of data of a case where a network name is set according to the third embodiment.

FIG. 15 is a diagram illustrating an example of data of a connection request according to a sixth embodiment.

DETAILED DESCRIPTION OF THE INVENTION

Hereinafter, wireless communication systems according to embodiments of the present invention will be described with reference to the drawings.
(First Embodiment)

Figure 1:
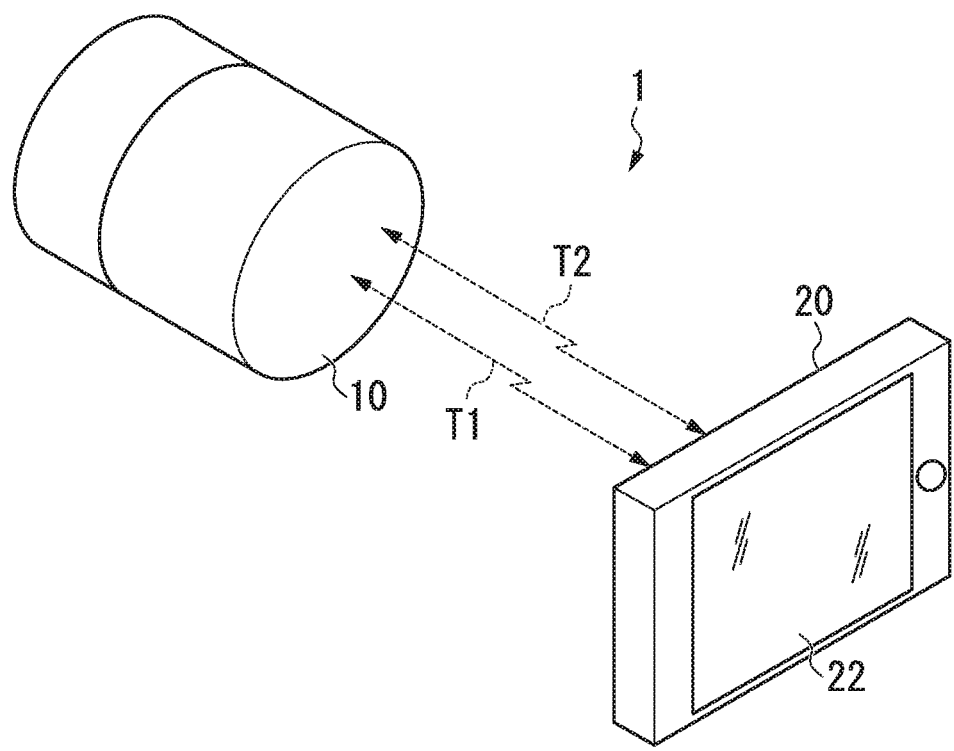
FIG. 1 is an external view illustrating an example of a wireless communication system according to a first embodiment.

FIG. 1 is an external view illustrating an example of a wireless communication system 1 according to a first embodiment.

As illustrated in FIG. 1, the wireless communication system 1 includes an imaging terminal 10 and an external terminal 20.

The imaging terminal 10 (an example of a wireless communication terminal), for example, is an imaging apparatus such as a camera including an imaging lens.

The external terminal 20, for example, is a mobile phone such as a smartphone and is connected to the imaging terminal 10 by using wireless communication. The external terminal 20 can check the composition and the like by displaying a live image of the imaging terminal 10 on a display unit 22 through wireless communication and can perform various operations such as shutter pressing of the imaging terminal 10. The external terminal 20 can read and store image data captured by the imaging terminal 10 through wireless communication.

The imaging terminal 10 and the external terminal 20 can communicate with each other through wireless communication T1 using a first communication protocol (for example, Bluetooth (registered trademark)) or wireless communication T2 using a second communication protocol (for example, a wireless local area network (LAN)). Here, according to the second communication protocol, for example, the imaging terminal 10 is started in an access point mode of the wireless LAN, and the external terminal 20 is started in a station mode of the wireless LAN for communication. In other words, the second communication protocol is a communication protocol which is only applicable to a one-to-one communication connection, and the first communication protocol is a communication protocol which is applicable to one to many communication connections.

Figure 2:
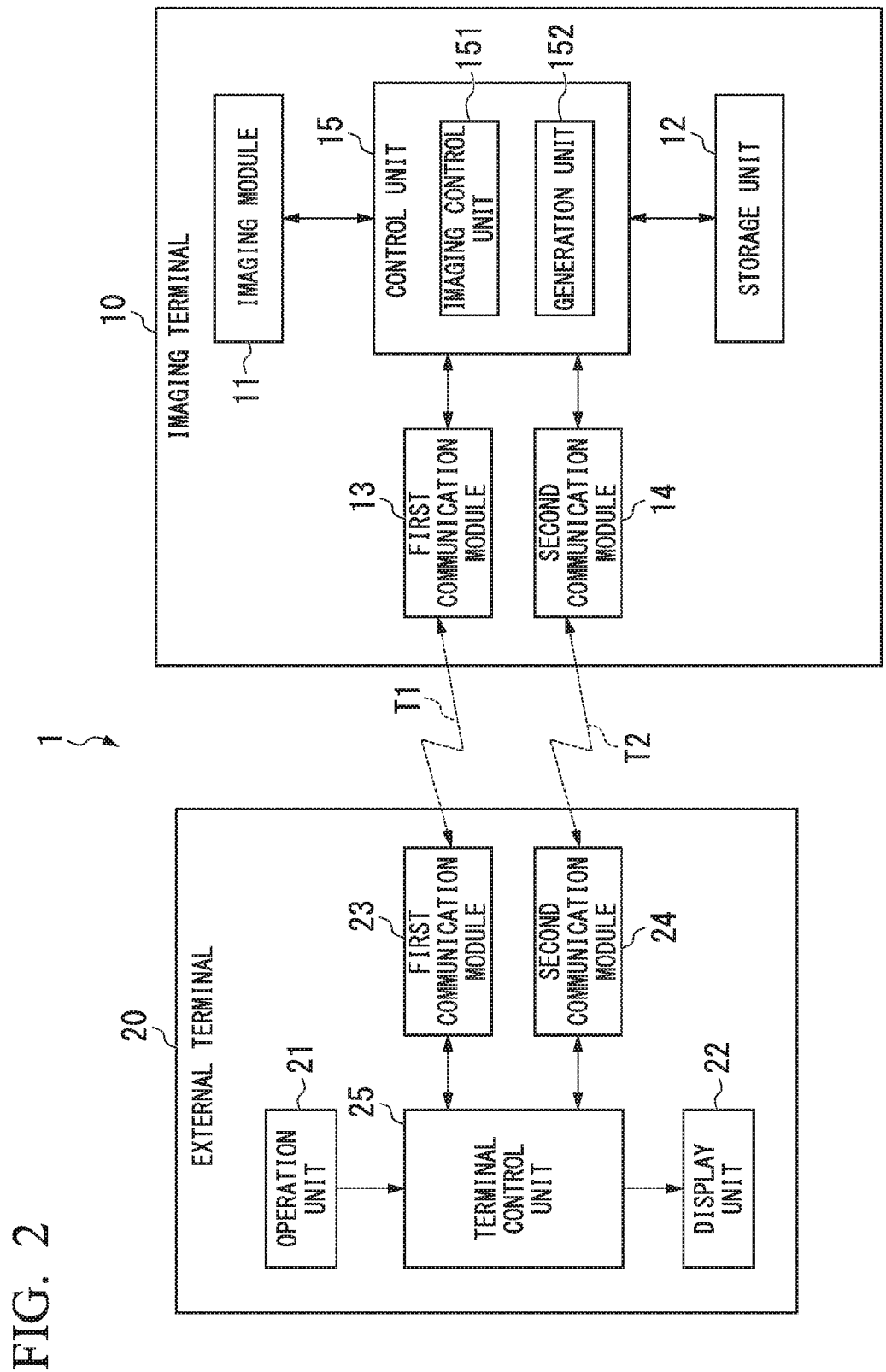
FIG. 2 is a block diagram illustrating an example of the wireless communication system according to the first embodiment.

FIG. 2 is a block diagram illustrating an example of the wireless communication system 1 according to the present embodiment.

First, the configuration of the imaging terminal 10 according to the present embodiment will be described.

As illustrated in FIG. 2, the imaging terminal 10 includes: an imaging module 11; a storage unit 12; a first communication module 13; a second communication module 14; and a control unit 15.

The imaging module 11, for example, includes an imaging lens and a solid-state imaging device and captures an image and outputs image data.

The storage unit 12 stores image data captured by the imaging module 11 and various kinds of information used for the process of the imaging terminal 10. The storage unit 12, for example, is a flash memory.

The first communication module 13, for example, is a communication device or a communication apparatus and the like used for performing wireless communication with the external terminal 20. More specifically, the first communication module 13 performs wireless communication with the external terminal 20 by using the first communication protocol (for example, Bluetooth (registered trademark)). Here, the first communication protocol, for example, is a communication protocol simultaneously applicable to one to many communication connections in a data link layer of an open systems interconnection (OSI) layer model. The first communication module 13, for example, receives a connection request used for requesting a connection with the external terminal 20 by using the second communication module 14 and terminal-specifying information (for example, a media access control (MAC) address or the like) used for specifying the external terminal 20. The terminal-specifying information, for example, is specifying information that uniquely specifies the external terminal 20. The first communication module 13, for example, transmits a network identifier generated by a generation unit 152 to be described later and a password to the external terminal 20.

The second communication module 14, for example, is a communication device or a communication apparatus and the like used for performing wireless communication with the external terminal 20. More specifically, the second communication module 14 performs wireless communication with the external terminal 20 by using the second communication protocol (for example, the wireless LAN). Here, the second communication protocol, for example, is a communication protocol incapable of simultaneous one to many communication connections in the data link layer and performs communication between the imaging terminal 10 starting (generating) a network and the external terminal 20 participating (connecting) in the network. The second communication module 14, through a network, for example, receives instruction information directing various operations of the imaging terminal 10 and transmits image data between the imaging terminal 10 and the external terminal 20.

The control unit 15, for example, is a processor including a central processing unit (CPU) and the like and performs overall control of the imaging terminal 10. The control unit 15 includes an imaging control unit 151 and the generation unit 152.

The imaging control unit 151 controls the imaging module 11. The imaging control unit 151, for example, acquires a live image captured by the imaging module 11 and causes the second communication module 14 to transmit the acquired live image to the external terminal 20. For example, the imaging control unit 151, in accordance with an imaging instruction received from the external terminal 20 through the second communication module 14, causes the imaging module 11 to capture an image to generate image data. Furthermore, for example, the imaging control unit 151 stores image data captured by the imaging module 11 in the storage unit 12. For example, the imaging control unit 151 causes the second communication module 14 to transmit image data stored by the storage unit 12 to the external terminal 20.

In a case where the first communication module 13 receives the connection request and the terminal-specifying information described above from the external terminal 20 by using the first communication protocol, the generation unit 152 generates a network identifier used for identifying a network based on the terminal-specifying information. Here, the network, for example, is a network enabling a connection on a higher layer than the data link layer, and the second communication module 14 performs wireless communication with the external terminal 20 through the network. The network identifier, for example, is a service set identifier (SSID) in a wireless LAN. The generation unit 152 generates a password (for example, an encryption key) used for a connection to a network corresponding to the generated network identifier.

The generation unit 152, for example, by using a hash function, generates a network identifier and a password from the terminal-specifying information as hash values. In other words, the generation unit 152, for example, generates a network identifier (SSID) by using the following Equation (1) and generates a password (PASS) by using Equation (2) described below.

$$SSID = hash1(MAC) \quad (1)$$

$$PASS = hash2(MAC) \quad (2)$$

Here, a variable MAC represents a MAC address of the external terminal 20, and hash1( ) and hash2( ) represent hash functions. The hash functions (hash1 ( ) and hash2( )), for example, are perfect hash functions, and it is assumed to be assured that a mapping result is one-to-one mapping for terminal-specifying information (MAC) that is an input value.

The generation unit 152 causes the second communication module 14 to establish a logical link of communication with the external terminal 20 by using the network identifier and the password that are generated and then starts the network to be in a state being communicable with the external terminal 20 on a higher layer than a layer in which the logical link of the communication is established. Then, the generation unit 152 causes the first communication module 13 to transmit the network identifier and the password to the external terminal 20 by using the first communication protocol.

The generation unit 152 may perform control of the second communication module 14 not to start a network until power is supplied to the own apparatus (the imaging terminal 10) (power On), and the first communication module 13 receives a connection request. Furthermore, the generation unit 152, for example, before the first communication module 13 receives terminal-specifying information, may cause the second communication module 14 to start a network based on a network identifier generated based on terminal-specifying information received previously (in the past). Here, cases where a network is started before the reception of terminal-specifying information in the first communication module 13, for example, include a case where the first communication module 13 does not include terminal-specifying information but receives only a connection request, a case where the second communication module 14 is set in advance to start a network when the imaging terminal 10 becomes On, and the like.

Next, the configuration of the external terminal 20 according to the present embodiment will be described.

The external terminal 20 transmits a connection request and terminal-specifying information described above to the imaging terminal 10 by using the first communication protocol. The external terminal 20, for example, transmits a connection request and terminal-specifying information as illustrated in FIG. 3 to the imaging terminal 10 by using the first communication protocol.

FIG. 3 is a diagram illustrating an example of data of a connection request and terminal-specifying information according to the present embodiment.

In the example illustrated in FIG. 3, the connection request is a command of "REQUEST_CONNECTION", and the terminal-specifying information is "12:34:56:78:9A:BC". The terminal-specifying information represented here is a MAC address of a communication port of the first communication module 23 to be described later for the first communication protocol.

Referring back to FIG. 2, the external terminal 20 receives a network identifier and a password from the imaging terminal 10 by using the first communication protocol. Then, the external terminal 20 is connected to the network started by the wireless communication terminal based on the network identifier and the password received from the imaging terminal 10.

The external terminal 20 includes an operation unit 21, a display unit 22, a first communication module 23, a second communication module 24, and a terminal control unit 25.

The operation unit 21, for example, is an input device and the like used for receiving various operations. More specifically, the operation unit 21, for example, is an operation key or a touch panel and receives various operations for the external terminal 20. The operation unit 21, for example, is used for an operation of pressing a shutter when the imaging terminal 10 captures an image.

The display unit 22, for example, is a monitor or a display device and the like. More specifically, the display unit 22, for example, is a liquid crystal display and displays image data (for example, a live image or the like) captured by the imaging terminal 10, various messages, and the like.

The first communication module 23, for example, is a communication device or a communication apparatus and the like used for performing wireless communication with the imaging terminal 10. More specifically, the first communication module 23 performs wireless communication with the imaging terminal 10 by using the first communication protocol (for example, Bluetooth (registered trademark)). The first communication module 23, for example, notifies the imaging terminal 10 of an instruction of power On (power input) or power Off (power cutoff) of the imaging terminal 10. The first communication module 23 transmits the connection request and the terminal-specifying information described above to the imaging terminal 10.

The second communication module 24, for example, is a communication device or a communication apparatus and the like used for performing wireless communication with the imaging terminal 10. More specifically, the second communication module 24 performs wireless communication with the imaging terminal 10 by using the second communication protocol (for example, a wireless LAN). The second communication module 24, for example, is connected (participates in) the network by using the network identifier and the password (for example, an SSID and an encryption key) received from the imaging terminal 10 by the first communication module 23. The second communication module 24, for example, receives various kinds information such as a live image and image data from the imaging terminal 10 through the connected network. The second communication module 24 transmits various operation instruction s (for example, an imaging instruction and the like) for the imaging terminal 10 to the imaging terminal 10 through the connected network.

The terminal control unit 25, for example, is a processor including a CPU or the like and performs overall control of the external terminal 20. The terminal control unit 25, for example, performs a control process of operating the imaging terminal 10.

More specifically, the terminal control unit 25, for example, causes the first communication module 23 to transmit a connection request and terminal-specifying information as illustrated in FIG. 3 to the first communication module 23. The terminal control unit 25 causes the second communication module 24 to be connected to (participate in) the network started by the imaging terminal 10 by using the network identifier and the password received by the first communication module 23 from the imaging terminal 10. Then, the terminal control unit 25 causes the second communication module 24 to transmit an operation instruction operating the imaging terminal 10 through the connected (participating) network and transmits image data between the imaging terminal 10 and the external terminal 20.

Next, the operation of the wireless communication system 1 according to the present embodiment will be described with reference to FIG. 4.

Figure 4:
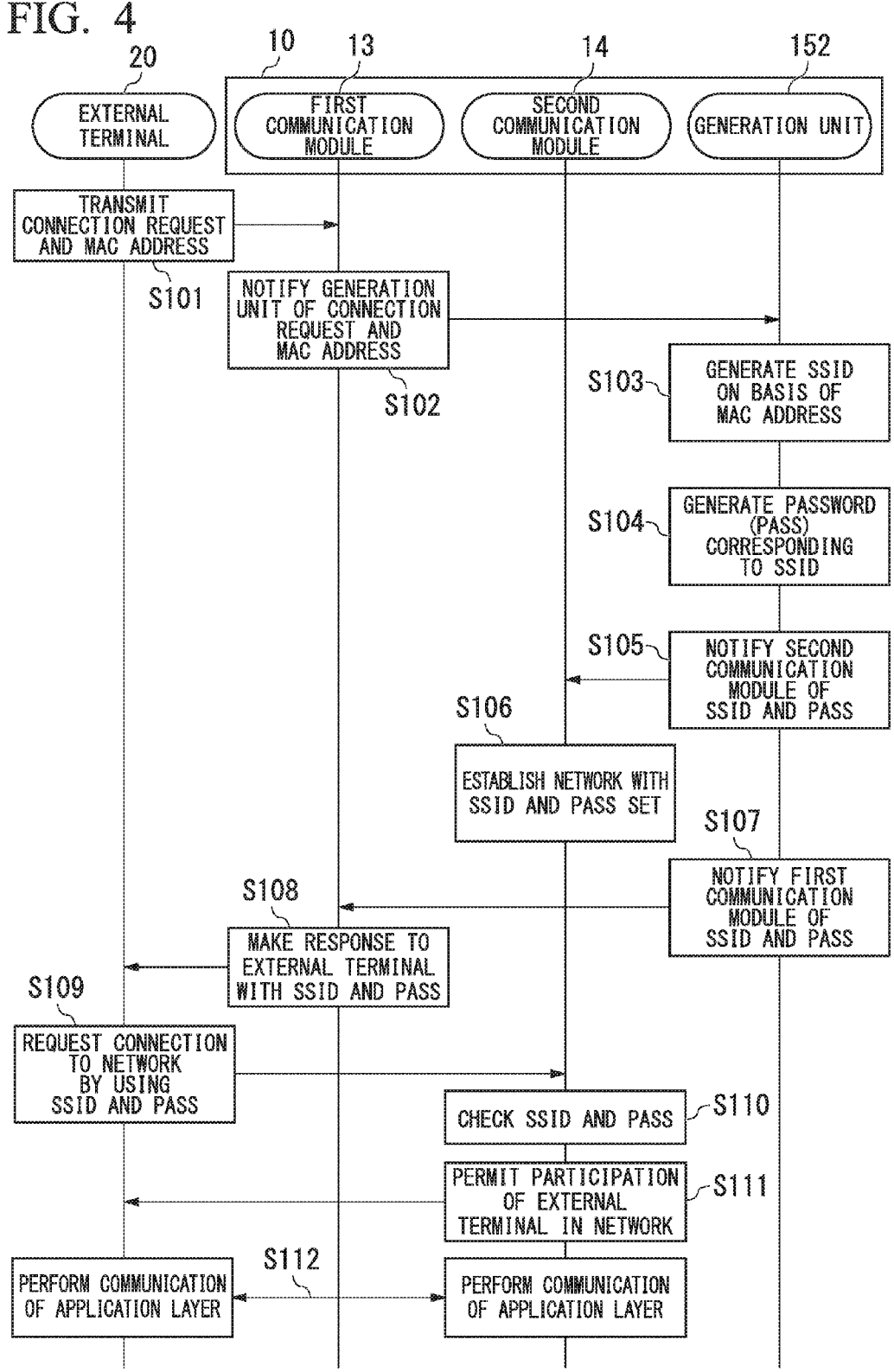
FIG. 4 is a diagram illustrating an example of the operation of the wireless communication system according to the first embodiment.

FIG. 4 is a diagram illustrating an example of the operation of the wireless communication system 1 according to the present embodiment.

In the example illustrated in FIG. 4, first, the external terminal 20 transmits a connection request and a MAC address (Step S101). In other words, the terminal control unit 25 of the external terminal 20, for example, in accordance with a user's operation for the operation unit 21, acquires a MAC address of the first communication module 23 as terminal-specifying information and transmits a connection request and a MAC address as illustrated in FIG. 3 to the first communication module 23.

Next, the first communication module 13 of the imaging terminal 10 notifies the generation unit 152 of the control unit 15 of the connection request and the MAC address received from the external terminal 20 (Step S102).

Next, the generation unit 152 generates an SSID (network identifier) based on the MAC address received by the first communication module 13 (Step S103). The generation unit 152, for example, generates an SSID (for example, "nEwvIgWUJ0xa") based on the MAC address (for example, "12:34:56:78:9A:BC") by using Equation (1) described above.

Next, the generation unit 152 generates a password (PASS) corresponding to the SSID (Step S104). The generation unit 152, for example, generates a PASS (for example, "jntpYVfL73PB") based on a MAC address (for example, "12:34:56:78:9A:BC") by using Equation (2) described above.

In this way, in a case where the first communication module 13 receives the connection request and the MAC address from the external terminal 20, the generation unit 152 generates an SSID and a PASS based on the MAC address.

Next, the generation unit 152 notifies the second communication module 14 of the SSID and the PASS (Step S105).

Next, the second communication module 14 establishes a network (for example, "network 1") by setting the SSID and the PASS generated by the generation unit 152 (Step S106). In other words, the second communication module 14 starts the "network 1" to be in a connectable state by using the SSID and the PASS.

In this way, the generation unit 152 causes the second communication module 14 to start the "network 1" using the SSID (network identifier).

Next, the generation unit 152 notifies the first communication module 13 of the SSID and the PASS (Step S107). In other words, the generation unit 152, for example, notifies the first communication module 13 of "nEwvIgWUJ0xa" and "jntpYVfL73PB".

Next, the first communication module 13 responds to the external terminal 20 with the SSID and the PASS generated by the generation unit 152 (Step S108). In other words, the first communication module 13, for example, transmits "nEwvIgWUJ0xa" and "jntpYVfL73PB" to the external terminal 20 by using the first communication protocol.

In this way, the generation unit 152 causes the first communication module 13 to transmit the SSID (network identifier) and the PASS (password) that are generated to the external terminal 20 by using the first communication protocol.

Next, the external terminal 20 requests a connection for the network by using the SSID and the PASS that are received (Step S109). The terminal control unit 25 of the external terminal 20 causes the second communication module 24 to request a connection for the "network 1", for example, by using "nEwvIgWUJ0xa" and "jntpYVfL73PB".

Next, the second communication module 14 of the imaging terminal 10 checks the SSID and the PASS in accordance with the request from the external terminal 20 (Step S110).

Next, the second communication module 14 permits the external terminal 20 to participate in the network (Step S111). In other words, the second communication module 14, for example, permits the external terminal 20 to participate in the "network 1" by using "nEwvIgWUJ0xa" and "jntpYVfL73PB".

Then, communication of an application layer is performed between the imaging terminal 10 and the external terminal 20 (Step S112). Accordingly, the external terminal 20, for example, is enabled to acquire a live image from the imaging terminal 10 by using the second communication protocol and display the acquired live image on the display unit 22 or is enabled to transmit an imaging instruction to the imaging terminal 10 by using the second communication protocol.

In the present embodiment described above, while an example in which the generation unit 152 generates the password (PASS) has been described, the generation of the password is not limited thereto. For example, in a case where a predetermined password is determined (set) in advance between the imaging terminal 10 and the external terminal 20 or the like, the generation unit 152 may not generate a password.

While an example in which the generation unit 152 generates a password by using Equation (2) has been described, the password (PASS) may be generated using the following Equation (3).

$$PASS = hash1(SSID) \qquad (3)$$

Here, SSID is a network identifier generated by using Equation (1) described above. Hash1( ) represents the same hash function as that of Equation (1).

In this way, the generation unit 152 may generate a password (encryption key) based on the generated network identifier.

As described above, the imaging terminal 10 (an example of a wireless communication terminal) according to the present embodiment includes the first communication module 13, the second communication module 14, and the generation unit 152. The first communication module 13 performs wireless communication with the external terminal 20 by using the first communication protocol. The second communication module 14 performs wireless communication with the external terminal 20 by using the second communication protocol. In a case where the first communication module 13 receives a connection request requesting a connection and terminal-specifying information from the external terminal 20 by using the first communication protocol, the generation unit 152 generates a network identifier (for example, SSID) used for identifying a network using the second communication protocol based on the terminal-specifying information. Here, the terminal-specifying information is identification information used for specifying the external terminal 20 and, for example, is a MAC address of the external terminal 20. The generation unit 152 causes the second communication module 14 to establish a logical link of communication with the external terminal 20 by using the network identifier and then starts a network based on the network identifier to be in a communicable state for the external terminal 20 on a higher layer than a layer in which the logical link of the communication is established and causes the first communication module 13 to transmit the network identifier to the external terminal 20 by using the first communication protocol.

In this way, the imaging terminal 10 according to the present embodiment starts a network (for example, "network 1") corresponding to the external terminal 20, and the external terminal 20 is connected to network by using the network identifier generated by the generation unit 152. Thus, for example, in a case where a plurality of connectable external terminals 20 are present, the imaging terminal 10 according to the present embodiment can prevent an unintended connection from an external terminal 20 to the imaging terminal 10.

For example, in a case where there was a connection in the past, the imaging terminal 10 according to the present embodiment can easily perform a connection using the second communication protocol by using the network identifier that has already been generated.

Furthermore, in the present embodiment, the generation unit 152 generates a password (for example, an encryption key) used for a connection to the network together with generating a network identifier and causes the first communication module 13 to transmit the network identifier and the password to the external terminal 20 by using the first communication protocol.

In this way, the imaging terminal 10 according to the present embodiment can prevent an unintended connection from an external terminal 20 to the imaging terminal 10 more securely.

In the present embodiment, until the first communication module 13 receives a connection request after the supply of power to the own apparatus (the imaging terminal 10), the generation unit 152 does not cause the second communication module 14 to start the network.

In this way, the imaging terminal 10 according to the present embodiment starts a network according to the second communication module 14 such as a wireless LAN having relatively high power consumption when control of the imaging terminal 10 or image transmission is necessary. For this reason, the imaging terminal 10 according to the present embodiment can decrease power consumption.

In the present embodiment, before the first communication module 13 receives terminal-specifying information, the generation unit 152 may cause the second communication module 14 to start a network based on a network identifier generated based on the terminal-specifying information received in the past.

In such a case, the external terminal 20 can be connected to a network using a network identifier of the network connected in the past without receiving a network identifier.

In other words, the imaging terminal 10 according to the present embodiment can easily perform a connection to the external terminal 20 using the second communication protocol.

In the present embodiment, the first communication protocol is a communication protocol applicable to one-to-many communication connections, and the second communication protocol is a communication protocol only applicable to a one-to-one communication connection.

Accordingly, the imaging terminal 10 according to the present embodiment can prevent an unintended connection from an external terminal 20 to the imaging terminal 10 more assuredly.

The wireless communication system 1 according to the present embodiment includes the imaging terminal 10 and the external terminal 20 described above. The external terminal 20 transmits a connection request and terminal-specifying information to the imaging terminal 10 by using the first communication protocol and is connected to a network started by the imaging terminal 10 based on a network identifier received from the imaging terminal 10.

Accordingly, the wireless communication system 1 according to the present embodiment, similar to the imaging terminal 10 described above, can prevent an unintended connection from an external terminal 20 to the imaging terminal 10.

A wireless communication method according to the present embodiment is a wireless communication method between an imaging terminal 10 and an external terminal 20 and includes a first transmission step, a generation step, a start-up step, a second transmission step, and a connection step. In the first transmission step (an example of a transmission step), the external terminal 20 transmits a connection request requesting a connection and terminal-specifying information used for specifying the external terminal 20 to a wireless communication terminal by using the first communication protocol. In the generation step, in a case where the connection request and the terminal-specifying information transmitted in the first transmission step are received from the external terminal 20 through the first communication module 13 by using the first communication protocol, the imaging terminal 10 generates a network identifier used for identifying a network using the second communication protocol based on the terminal-specifying information. In the start-up step, the imaging terminal 10 causes the second communication module 14 to establish a logical link of communication with the external terminal 20 by using the network identifier generated in the generation step and then starts a network based on the network identifier to be in a communicable state for the external terminal 20 on a higher layer than a layer in which the logical link of the communication is established. In the second transmission step, the imaging terminal 10 causes the first communication module 13 to transmit the network identifier to the external terminal 20 by using the first communication protocol. In the connection step, the external terminal 20 is connected to the network by using the second communication protocol based on the network identifier transmitted from the imaging terminal 10 in the second transmission step.

In this way, the wireless communication method according to the present embodiment, similar to the imaging terminal 10 and the wireless communication system 1 described above, can prevent an unintended connection from an external terminal 20 to the imaging terminal 10.

(Second Embodiment)

Next, a wireless communication system according to a second embodiment will be described with reference to the drawings.

Figure 5:
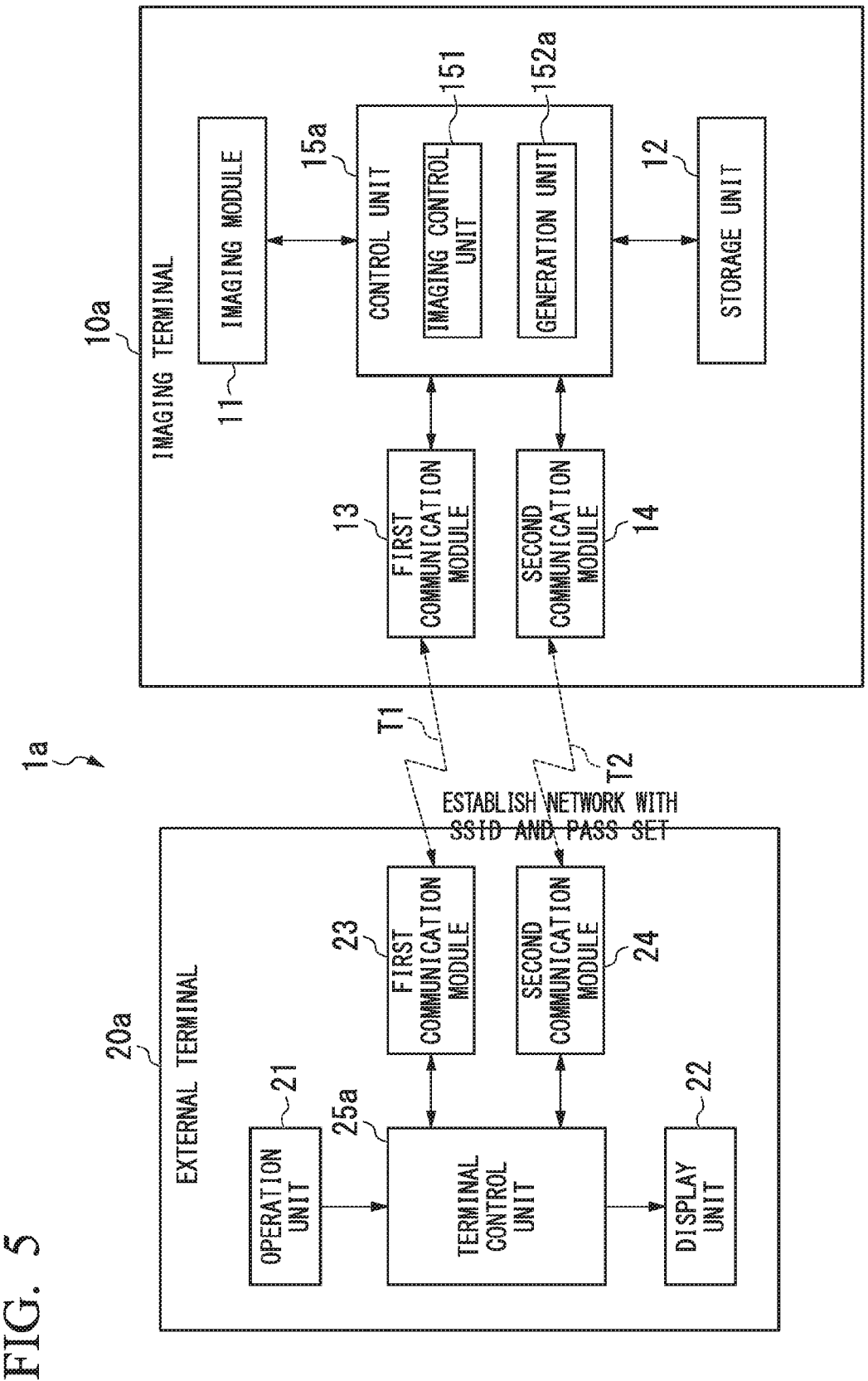
FIG. 5 is a block diagram illustrating an example of a wireless communication system according to a second embodiment.

FIG. 5 is a block diagram illustrating an example of the wireless communication system 1a according to the present embodiment.

As illustrated in FIG. 5, the wireless communication system 1a includes an imaging terminal 10a and an external terminal 20a.

In FIG. 5, the same reference numerals will be assigned to the same configuration as a configuration illustrated in FIG. 1, and description thereof will not be presented.

The imaging terminal 10a (an example of a wireless communication terminal) includes: an imaging module 11; a storage unit 12; a first communication module 13; a second communication module 14; and a control unit 15a.

The control unit 15a, for example, is a processor including a CPU or the like and performs overall control of the imaging terminal 10a. The control unit 15a includes an imaging control unit 151 and a generation unit 152a.

The process of generating a network identifier and a password performed by the generation unit 152a is similar to that performed by the generation unit 152 according to the first embodiment described above. The generation unit 152a, similar to the first embodiment, causes the second communication module 14 to start a network using the network identifier and the password that are generated. In the present embodiment, the generation unit 152a does not cause the first communication module 13 to transmit the network identifier and the password that are generated to the external terminal 20a, which is different from the first embodiment.

The external terminal 20a includes an operation unit 21, a display unit 22, a first communication module 23, a second communication module 24, and a terminal control unit 25a.

The terminal control unit 25a, for example, is a processor including a CPU or the like and performs overall control of the external terminal 20a. The terminal control unit 25a transmits a connection request and terminal-specifying information to the first communication module 23 and generates a network identifier and a password by using a method similar to that of the generation unit 152a. In other words, the terminal control unit 25a generates a network identifier and a password based on the terminal-specifying information. Then, the terminal control unit 25a causes the second communication module 24 to be connected to (participate in) the network started by the imaging terminal 10a by using the network identifier and the password that are generated.

Next, the operation of the wireless communication system 1a according to the present embodiment will be described with reference to FIG. 6.

Figure 6:
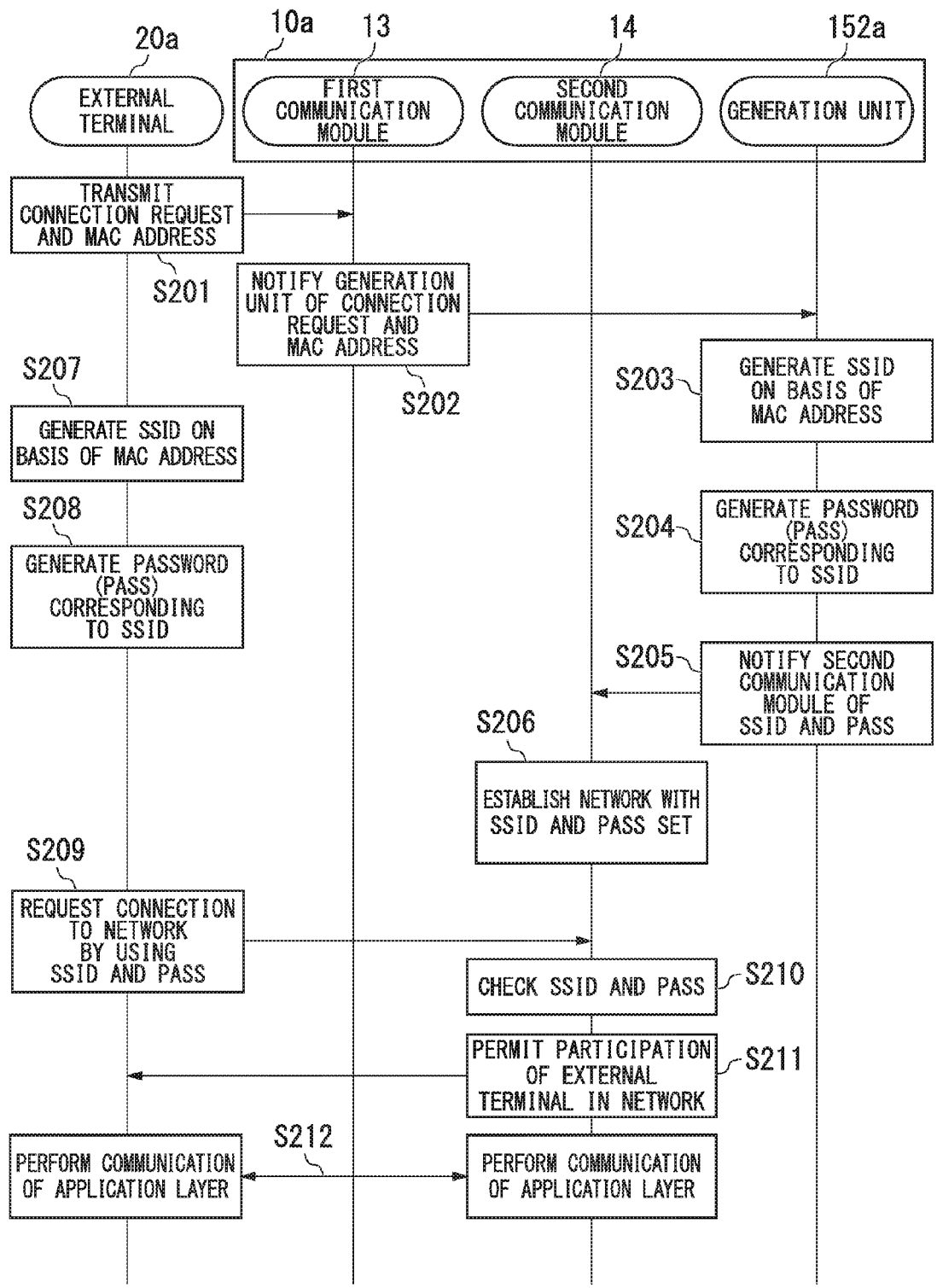
FIG. 6 is a diagram illustrating an example of the operation of the wireless communication system according to the second embodiment.

FIG. 6 is a diagram illustrating an example of the operation of the wireless communication system 1a according to the present embodiment.

In the example illustrated in FIG. 6, the process of Steps S201 to S206 is similar to the process of Steps S101 to S106 illustrated in FIG. 4, and the description thereof will not be presented here.

In Step S207, the terminal control unit 25a of the external terminal 20a generates an SSID (network identifier) based on the MAC address. The terminal control unit 25a, for example, generates an SSID (for example, "nEwvIgWUJ0xa") based on the MAC address (for example, "12:34:56:78:9A:BC") by using Equation (1) described above.

Next, the terminal control unit 25a generates a password (PASS) corresponding to the SSID (Step S208). The terminal control unit 25a, for example, generates a PASS (for example, "jntpYVfL73PB") based on the MAC address (for example, "12:34:56:78:9A:BC") by using Equation (2) described above.

In this way, in a case where the first communication module 23 receives the connection request and the MAC address from the external terminal 20a, the terminal control unit 25a generates an SSID and a PASS based on the MAC address.

The process of subsequent Steps S209 to S212 is similar to the process of Steps S109 to S112 illustrated in FIG. 4, and thus, the description thereof will not be presented here.

As described above, the imaging terminal 10a according to the present embodiment includes a first communication module 13, a second communication module 14, and a generation unit 152a. In a case where the first communication module 13 receives a connection request requesting a connection and terminal-specifying information used for specifying the external terminal 20a from the external terminal 20a by using the first communication protocol, the generation unit 152a generates a network identifier used for identifying a network using the second communication protocol based on the terminal-specifying information. The generation unit 152a causes the second communication module 14 to establish a logical link of communication with the external terminal 20a by using the generated network identifier and then starts a network based on the network identifier to be in a communicable state for the external terminal 20a on a higher layer than a layer in which the logical link of the communication is established.

In this way, the imaging terminal 10a according to the present embodiment, similar to the first embodiment, can prevent an unintended connection from the external terminal 20a for the imaging terminal 10a.

In the wireless communication system 1a according to the present embodiment, both the imaging terminal 10a and the external terminal 20a generate a network identifier based on the terminal-specifying information of the external terminal 20a and perform wireless communication with each other in a network corresponding to the network identifier by using the second communication protocol.

In this way, for example, in a case where a plurality of connectable external terminals 20a are present, the wireless communication system 1a according to the present embodiment can prevent an unintended connection from an external terminal 20a for the imaging terminal 10a.

In the process of Step S206 described above, when a network is to be started, the second communication module 14 may be configured to dynamically scan the imaging terminal 10a from the external terminal 20a without transmitting a beacon used for giving a notification of the network identifier (SSID) (for example, an extended service set identifier (ESSID) stealth). In this way, the imaging terminal 10a according to the present embodiment can further prevent a misconnection from an external terminal 20a.

(Third Embodiment)

Next, a wireless communication system according to a third embodiment will be described with reference to the drawings.

Figure 7:
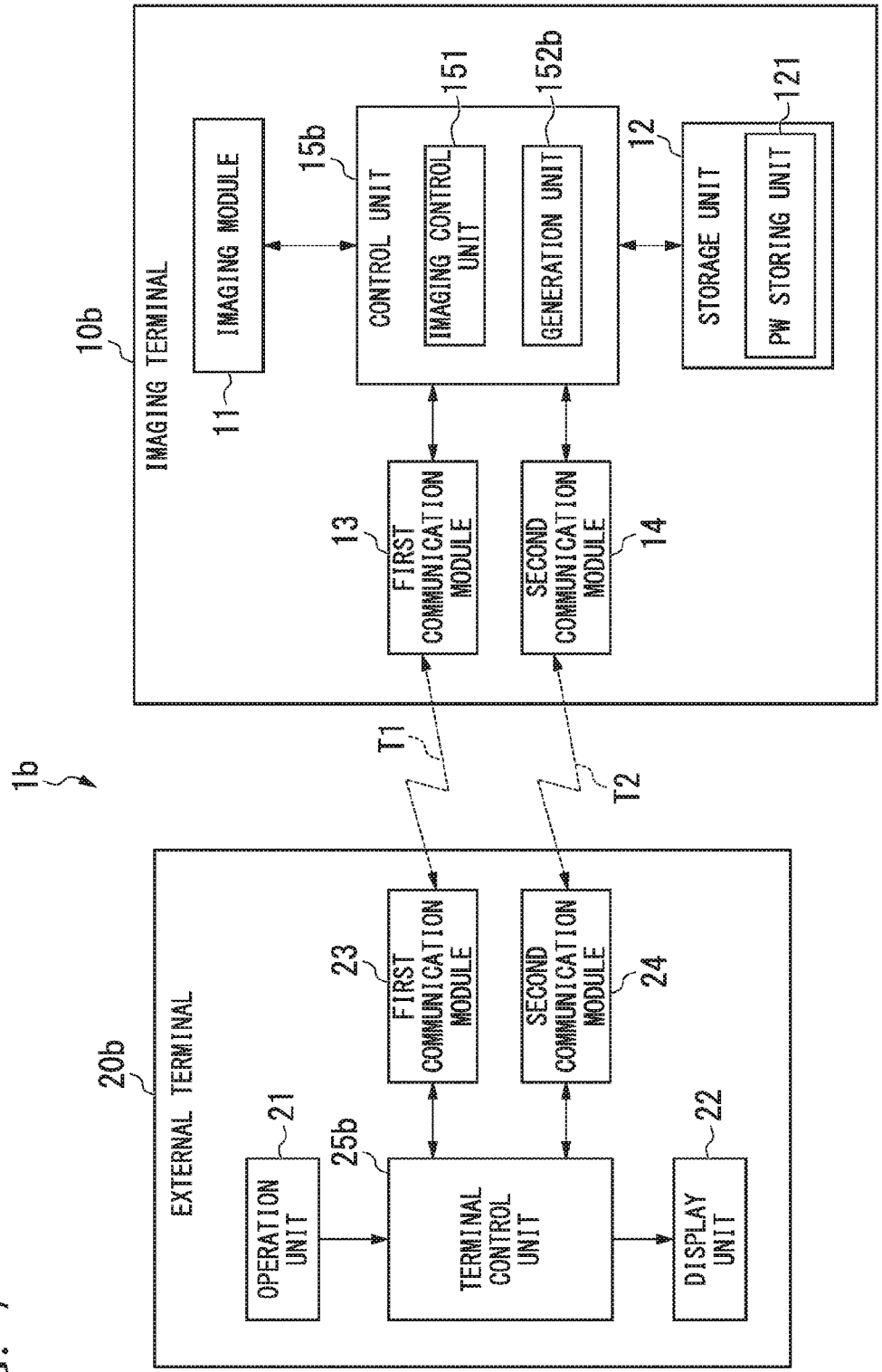
FIG. 7 is a block diagram illustrating an example of a wireless communication system according to a third embodiment.

FIG. 7 is a block diagram illustrating an example of the wireless communication system 1b according to the present embodiment.

As illustrated in FIG. 7, the wireless communication system 1b includes an imaging terminal 10b and an external terminal 20b.

In FIG. 7, the same reference numerals will be assigned to the same configuration as a configuration illustrated in FIG. 1, and description thereof will not be presented.

The imaging terminal 10b (an example of a wireless communication terminal) includes: an imaging module 11; a storage unit 12; a first communication module 13; a second communication module 14; and a control unit 15b.

The control unit 15b, for example, is a processor including a CPU or the like and performs overall control of the imaging terminal 10b. The control unit 15b includes an imaging control unit 151 and a generation unit 152b.

In the present embodiment, the storage unit 12 includes a password (PW) storing unit 121.

The PW storing unit 121 stores a password (first authentication information) used for authenticating the external terminal 20b.

The present embodiment is different from the first embodiment in that the imaging terminal 10b includes the PW storing unit 121, the generation unit 152b performs an authentication process, and the generation unit 152b generates a network identifier and a password based on terminal-specifying information and own apparatus-specifying information.

The generation unit 152b determines whether or not the network is to be started based on the password (first authentication information) stored by the PW storing unit 121 and a password (second authentication information) received by the first communication module 13 from the external terminal 20b. For example, in a case where the password (first authentication information) stored by the PW storing unit 121 and the received password (second authentication information) match each other, the generation unit 152b performs the process of starting the network. On the other hand, in a case where the password (first authentication information) stored by the PW storing unit 121 and the received password (second authentication information) do not match each other, the generation unit 152b does not perform the process of starting the network.

The generation unit 152b generates a network identifier based on the terminal-specifying information and the own apparatus-specifying information used for specifying the own apparatus. Here, the own apparatus-specifying information, for example, is a MAC address of the own apparatus (the imaging terminal 10b).

More specifically, the generation unit 152b, for example, generates a network identifier and a password from the terminal-specifying information and the own apparatus-specifying information by using the hash function. In other words, the generation unit 152b, for example, generates a network identifier (SSID) by using the following Equation (4) and generates a password (PASS) by using the following Equation (5).

$$SSID = hash1(MAC\text{-}TERM | MAC\text{-}CAM) \quad (4)$$

$$PASS = hash2(MAC\text{-}TERM | MAC\text{-}CAM) \quad (5)$$

Here, a variable MAC-TERM represents a MAC address of the external terminal 20b, and a variable MAC-CAM represents a MAC address of the imaging terminal 10b. Hash1( ) and hash2( ) represent hash functions. Furthermore, "|" represents a concatenation of values.

The other processes of the generation unit 152b are similar to those of the first embodiment described above, and the description thereof will not be presented here.

The external terminal 20b includes an operation unit 21, a display unit 22, a first communication module 23, a second communication module 24, and a terminal control unit 25b.

The terminal control unit 25b, for example, is a processor including a CPU or the like and performs overall control of the external terminal 20b. The terminal control unit 25b transmits a password change request requesting to change the password (first authentication information) used for authenticating the external terminal 20b, for example, as illustrated in FIG. 8, to the first communication module 23 in accordance with a user's operation for the operation unit 21.

FIG. 8 is a diagram illustrating an example of data of a password change request according to the present embodiment.

In the example illustrated in FIG. 8, it is illustrated that the password change request is a command of "CHANGE_PASSWD", the old password is "f43e70c1f4", and a new password is "85d502106a". Here, the old password, for example, is an initial password and is assumed to be stored in the PW storing unit 121 in advance at the time of shipment of the imaging terminal 10b and be disclosed to a user by using a predetermined method.

The terminal control unit 25b, by transmitting the password change request as illustrated in FIG. 8, changes the password for authentication that is stored by the imaging terminal 10b.

The terminal control unit 25b causes the first communication module 23 to transmit a connection request, terminal-specifying information, and the password (second authentication information) used for authenticating the external terminal 20b described above. The other processes of the terminal control unit 25b are similar to those according to the first embodiment described above, and thus, the description thereof will not be presented.

Next, the operation of the wireless communication system 1b according to the present embodiment will be described with reference to the drawing.

Figure 9:
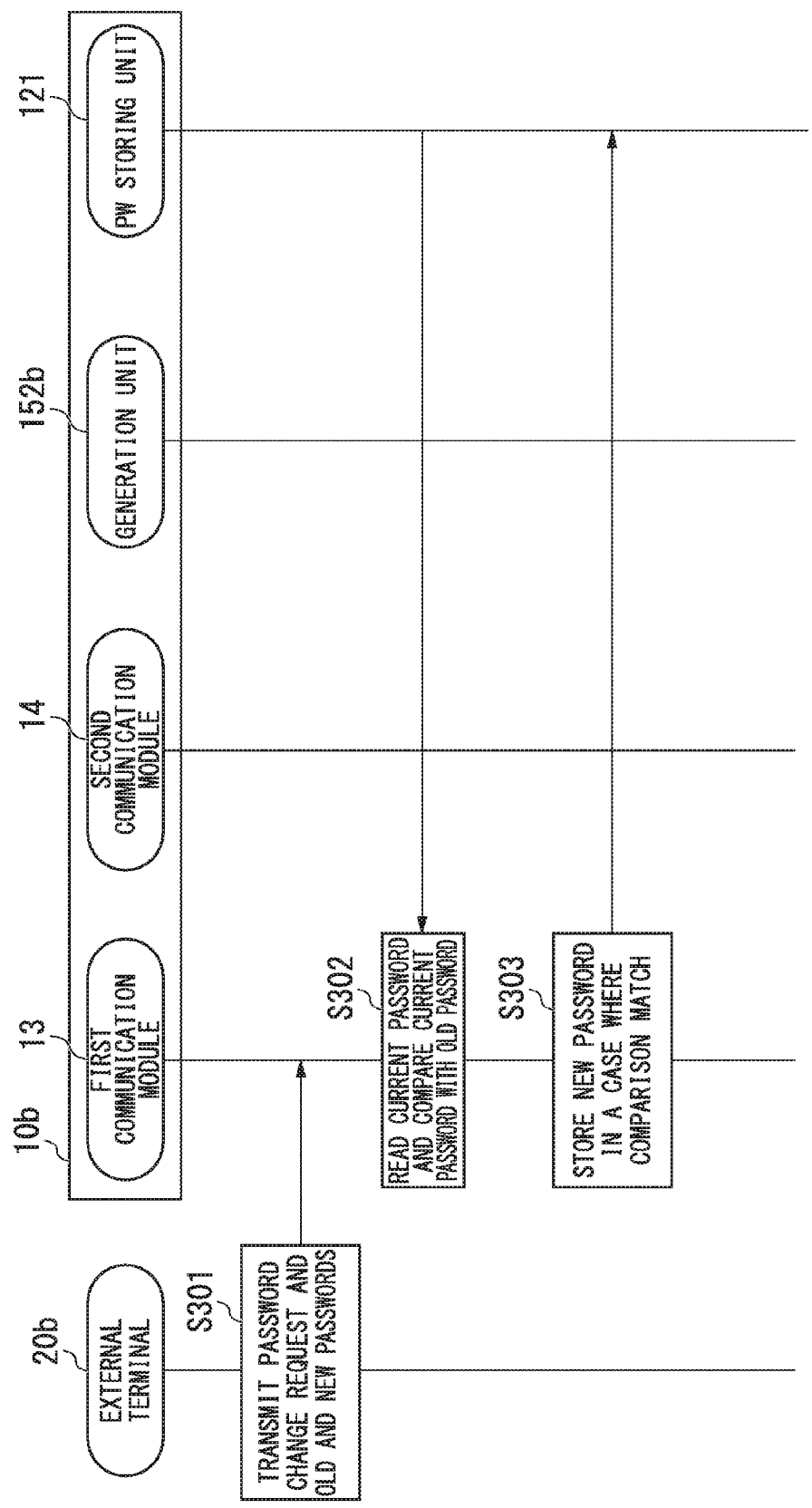
FIG. 9 is a diagram illustrating an example of a password changing operation according to the third embodiment.

FIG. 9 is a diagram illustrating an example of a password change operation according to the present embodiment.

In the example illustrated in FIG. 9, first, the external terminal 20b transmits a password change request and old and new passwords (Step S301). In other words, the terminal control unit 25b of the external terminal 20b, for example, acquires an old password and a new password in accordance with a user's operation for the operation unit 21 and causes the first communication module 23 to transmit a password change request and the old and new passwords as illustrated in FIG. 8.

Next, the first communication module 13 of the imaging terminal 10b reads the current password and makes a comparison (Step S302). In other words, the first communication module 13 reads the current password from the PW storing unit 121 in accordance with the reception of the password change request and compares the read current password with the received old password (for example, "f43e70c1f4").

Next, in a case where a result of the comparison represents a match, the first communication module 13 stores the new password (Step S303). In other words, in a case where the current password and the old password match each other in Step S302, the first communication module 13 stores the received new password (for example, "85d502106a") in the PW storing unit 121 as a new password (first authentication information).

In this way, the wireless communication system 1b changes the password (first authentication information) used for authenticating the external terminal 20b.

In the example described above, while an example in which the first communication module 13 performs the process of comparing passwords and changing the password has been described, the generation unit 152b may perform a part or all of such a process. Instead of the first communication module 13, the second communication module 14 may be configured to perform the process of comparing the passwords and changing the password.

Next, operations of wireless communication between the external terminal 20b and the imaging terminal 10b will be described with reference to FIG. 10.

Figure 10:
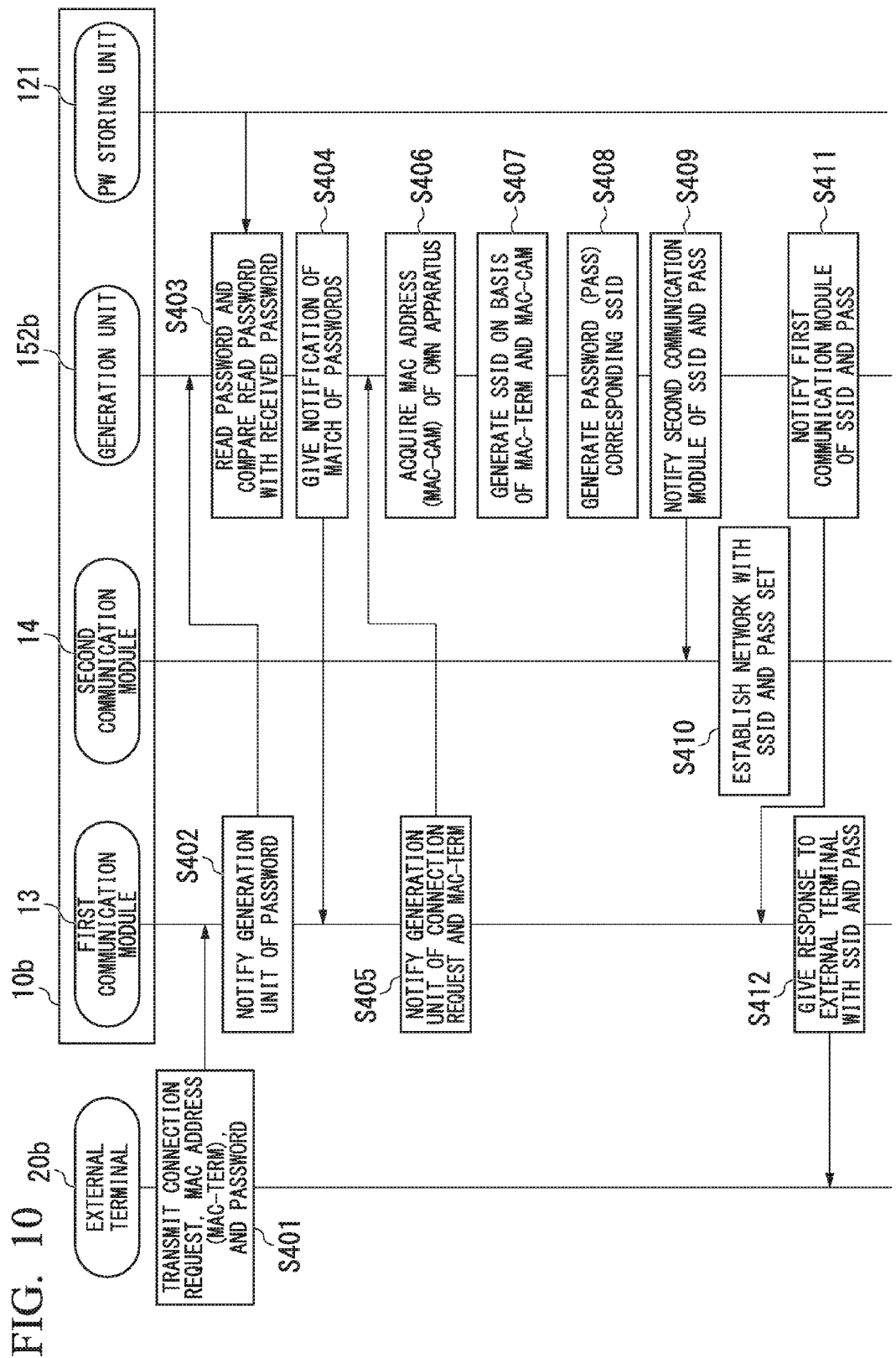
FIG. 10 is a diagram illustrating an example of the operation of the wireless communication system according to the third embodiment.

FIG. 10 is a diagram illustrating an example of the operation of the wireless communication system 1b according to the present embodiment.

In the example illustrated in FIG. 10, first, the external terminal 20b transmits a connection request, a MAC address (MAC-TERM), and a password (second authentication information) (Step S401). In other words, the terminal control unit 25b of the external terminal 20b, for example, acquires a MAC address of the first communication module 23 as terminal-specifying information and acquires a password (second authentication information) in accordance with a user's operation for the operation unit 21. The terminal control unit 25b causes the first communication module 23 to transmit the connection request, the MAC address, and the password. Here, the MAC address (MAC-TERM), for example, is "12:34:56:78:9A:BC".

Next, the first communication module 13 of the imaging terminal 10b notifies the generation unit 152b of the control unit 15b of the password (second authentication information) received from the external terminal 20b (Step S402).

Next, the generation unit 152b reads the password (first authentication information) and compares the read password with the received password (second authentication information) (Step S403). In other words, the generation unit 152b reads the password (first authentication information) from the PW storing unit 121 and compares the read password (first authentication information) with the received password (second authentication information).

Next, the generation unit 152b notifies the first communication module 13 of the match of the passwords (Step S404). In a case where the read password (first authentication information) and the received password (second authentication information) match each other, the generation unit 152b notifies the first communication module 13 of information representing the match. On the other hand, in a case where the read password (first authentication information) and the received password (second authentication information) do not match each other, the generation unit 152b stops the process for the received connection request. In other words, in a case where the read password (first authentication information) and the received password (second authentication information) do not match each other, the generation unit 152b stops the process of generating an SSID, the process of starting the network, and the process of transmitting the SSID to the external terminal 20b.

Next, the first communication module 13 notifies the generation unit 152b of the connection request and the MAC address received from the external terminal 20b (Step S405).

Next, the generation unit 152b acquires a MAC address (MAC-CAM) of the own apparatus (Step S406). Here, the MAC address (MAC-CAM) of the own apparatus, for example, is a MAC address (for example, "00:01:13:AB:CD:EF") of the communication port of the first communication module 13.

Next, the generation unit 152b generates an SSID (network identifier) based on the MAC-TERM and the MAC-CAM (Step S407). In other words, the generation unit 152b generates an SSID (network identifier) based on the MAC-TERM (for example, "12:34:56:78:9A:BC") received by the first communication module 13 and the acquired MAC-CAM (for example, "00:01:13:AB:CD:EF"). The generation unit 152b, for example, generates an SSID by using Equation (4) described above.

Next, the generation unit 152b generates a password (PASS) corresponding to the SSID (Step S408). The generation unit 152b, for example, generates the PASS based on the MAC address by using Equation (5) described above.

In this way, in a case where the first communication module 13 receives a connection request and a MAC address from the external terminal 20b, the generation unit 152b generates an SSID and a PASS based on the MAC address.

Next, the generation unit 152b notifies the second communication module 14 of the SSID and the PASS (Step S409).

Next, the second communication module 14 establishes a network (for example, "network 1") by setting the SSID and the PASS generated by the generation unit 152b (Step S410). In other words, the second communication module 14 starts the "network 1" to be in a connectable state by using the SSID and the PASS.

In this way, the generation unit 152b causes the second communication module 14 to start the "network 1" using the SSID (network identifier).

Next, the generation unit 152b notifies the first communication module 13 of the SSID and the PASS (Step S411).

Next, the first communication module 13 responds to the external terminal 20b with the SSID and the PASS generated by the generation unit 152b (Step S412).

The process after Step S412 is similar to the process of Steps S109 to S112 illustrated in FIG. 4, and thus the description thereof will not be presented here.

In the present embodiment described above, while an example in which the generation unit 152b generates a password by using Equation (5) has been described, the password (PASS) may be generated using Equation (2) or Equation (3) described above.

As described above, the imaging terminal 10b according to the present embodiment includes the PW storing unit 121 that stores a password (first authentication information) used for authenticating an external terminal 20b. The generation unit 152b determines whether or not the network is to be started based on the password (first authentication information) stored by the PW storing unit 121 and a password (second authentication information) received by the first communication module 13 from the external terminal 20b. For example, in a case where the password (first authentication information) stored by the PW storing unit 121 and the password (second authentication information) received by the first communication module 13 match each other, the generation unit 152b performs the process of starting the network.

In this way, in a case where the password (first authentication information) stored by the PW storing unit 121 and the password (second authentication information) received by the first communication module 13 do not match each other, the imaging terminal 10b does not transmit the network identifier (for example, the SSID) to the external terminal 20b. Accordingly, the imaging terminal 10b according to the present embodiment can prevent an unintended connection from a user and a leak of connection information (for example, the SSID and the PASS) of the second communication protocol, and the security can be improved.

The password (second authentication information) transmitted by the external terminal 20b described above may be acquired by a user through the operation unit 21.

In such a case, the imaging terminal 10b according to the present embodiment authenticates a user by using the password (second authentication information) and can prevent wireless communication between the imaging terminal 10b and the external terminal 20b in the case of not being used by a valid user. Accordingly, the imaging terminal 10b according to the present embodiment can further improve the security.

In the present embodiment, the generation unit 152b generates a network identifier based on the received terminal-specifying information (for example, MAC-TERM) and the own apparatus-specifying information (for example, MAC-CAM) used for specifying the own apparatus.

Accordingly, in a case where a plurality of imaging terminals 10b are present, the imaging terminal 10b according to the present embodiment can prevent any overlapping of the network identifiers.

In a case where a plurality of imaging terminals 10b are present in a distance range connectable from the external terminal 20b, in the embodiment described above, it cannot be checked by the user whether or not the imaging terminal is an intended imaging terminal 10b until the match of the password is checked. Thus, in the wireless communication system 1b described above, a connection using the first communication protocol is made by using a network name of the first communication protocol, and the password may be transmitted from the external terminal 20b.

In such a case, as the network name, a network name guaranteed to be unique to the imaging terminal 10b in association with a serial name or the like of the imaging terminal 10b by a manufacturer may be disclosed to a user in advance, or a network name may be set by the user. In a case where a network name is set by the user, while the network name cannot be guaranteed to be unique to an imaging terminal 10b, if the user assigns a different network name for each imaging terminal 10b intended to be connected, there is no problem.

In a case where a plurality of network names are stored by the external terminal 20b, and in a case where a plurality of network names matching the stored network name are present, the external terminal 20b may display network names corresponding to an imaging terminal 10b that is a connection destination on the display unit 22 on a user application or the like to be selected by the user. Alternatively, the connection priority may be determined by the user, or the external terminal 20b may be configured to be automatically connected based on conditions such as communication radio wave intensities and the like. For example, in a case where the first communication protocol is Bluetooth (registered trademark) Low Energy (BLE), the first communication module 13 of the imaging terminal 10b broadcasts local names corresponding to network names as advertised data (for the first communication module 23 of the external terminal 20b and the like).

For example, in a case where a network name of the first communication protocol is set by the external terminal 20b, the network name is set using a command as illustrated in FIG. 11.

FIG. 11 is a diagram illustrating an example of data of a case where a network name is set according to the third embodiment.

In the example illustrated in FIG. 11, it is illustrated that a network name setting command is "SET_NETWORK_NAME", and a network name to be set is "mycam483".

The first communication module 23 transmits the command as illustrated in FIG. 11 to the first communication module 13 to set the network name.

(Fourth Embodiment)

Next, a wireless communication system according to a fourth embodiment will be described with reference to the drawings.

Figure 12:
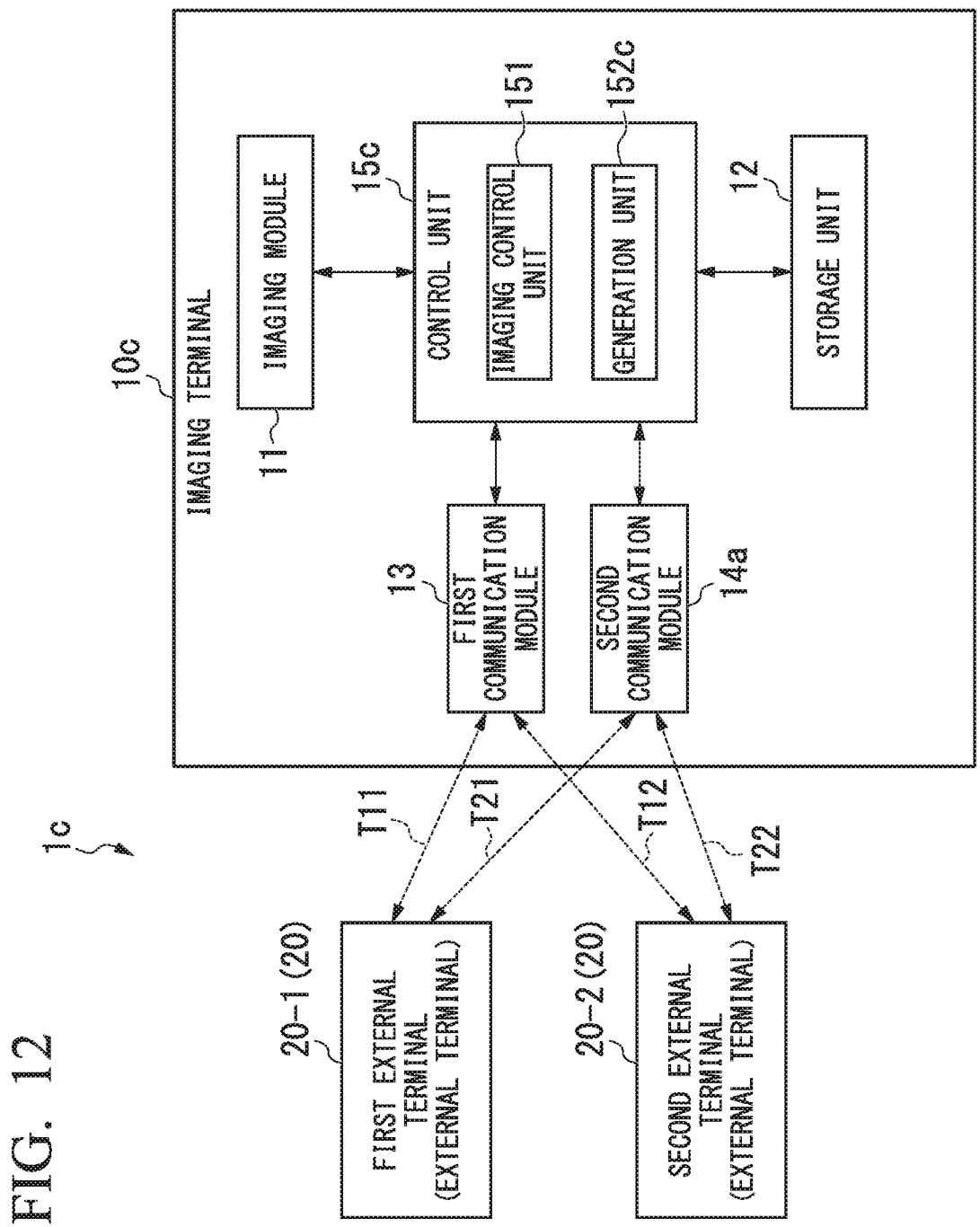
FIG. 12 is a block diagram illustrating an example of the wireless communication system according to a fourth embodiment.

FIG. 12 is a block diagram illustrating an example of the wireless communication system 1c according to the present embodiment.

As illustrated in FIG. 12, the wireless communication system 1c includes an imaging terminal 10c and a plurality of external terminals 20 (a first external terminal 20-1 and a second external terminal 20-2).

In FIG. 12, the same reference numerals will be assigned to the same configuration as a configuration illustrated in FIG. 1, and description thereof will not be presented.

In the example illustrated in FIG. 12, communication can be performed through wireless communication T11 using a first communication protocol and wireless communication T21 using a second communication protocol between the imaging terminal 10c and the first external terminal 20-1. Communication can be performed through wireless communication T12 using the first communication protocol and wireless communication T22 using the second communication protocol between the imaging terminal 10c and the second external terminal 20-2. Since the second communication protocol is a communication protocol which is only applicable to a one-to-one communication connection, the wireless communication T21 and the wireless communication T22 are switched to be performed.

In the present embodiment, an example of a process in which the wireless communication system 1c includes a plurality of external terminals 20, and switching among the plurality of external terminals 20 is performed will be described.

Each of the first external terminal 20-1 and the second external terminal 20-2 has a configuration similar to that of the external terminal 20 according to the first embodiment described above. Here, the first external terminal 20-1 represents an external terminal 20 that is initially connected to the imaging terminal 10c by using the second communication protocol or an external terminal 20 that has already been connected to the imaging terminal 10c by using the second communication protocol. The second external terminal 20-2 represents an external terminal 20 that is connected to the imaging terminal 10c by using the second communication protocol after the first external terminal 20-1.

The imaging terminal 10c (an example of a wireless communication terminal) includes: an imaging module 11; a storage unit 12; a first communication module 13; a second communication module 14a; and a control unit 15c. The first communication module 13 and the second communication module 14a, for example, are communication devices or communication apparatus and the like.

The control unit 15c, for example, is a processor including a CPU or the like and performs overall control of the imaging terminal 10c. The control unit 15c includes an imaging control unit 151 and a generation unit 152c.

While the basic process of the generation unit 152c is similar to that of the generation unit 152 according to the first embodiment, a process of switching among the plurality of external terminals 20 is added, which is different from the first embodiment.

For example, in a case where the first communication module 13 receives a connection request and first terminal-specifying information used for specifying the first external terminal 20-1 from the first external terminal 20-1, the generation unit 152c generates a first network identifier used for identifying a first network based on the first terminal-specifying information. Here, the first terminal-specifying information, for example, is a MAC address of the first external terminal 20-1, and the first network identifier, for example, is SSID1 used for identifying the first network (for example, "network 1"). The generation unit 152c generates a password (PASS1) corresponding to the first network identifier (SSID1). The generation unit 152c generates the first network identifier (SSID1) and the password (PASS1), for example, by using Equation (1) and Equation (2) described above.

The generation unit 152c causes the second communication module 14a to start the first network ("network 1") corresponding to the first network identifier (SSID1). In other words, the generation unit 152c causes the second communication module 14a to establish a logical link of communication with the first external terminal 20-1 by using the first network identifier (SSID1) and then starts the first network ("network 1") based on the first network identifier (SSID1) to be in a communicable state for the first external terminal 20-1 on a higher layer than a layer in which the logical link of the communication is established. Then, the generation unit 152c causes the first communication module 13 to transmit the first network identifier (SSID1) to the first external terminal 20-1 by using the first communication protocol.

For example, in a case where the first communication module 13 receives a connection request and second terminal-specifying information used for specifying the second external terminal 20-2 from the second external terminal 20-2, the generation unit 152c generates a second network identifier used for identifying a second network based on the second terminal-specifying information. Here, the second terminal-specifying information, for example, is a MAC address of the second external terminal 20-2, and the second network identifier, for example, is SSID2 used for identifying the second network (for example, "network 2"). The generation unit 152c generates a password (PASS2) corresponding to the second network identifier (SSID2). The generation unit 152c generates the second network identifier (SSID2) and the password (PASS2), for example, by using Equation (1) and Equation (2) described above.

The generation unit 152c causes the second communication module 14a to start the second network ("network 2") corresponding to the second network identifier (SSID2). In other words, the generation unit 152c causes the second communication module 14a to establish a logical link of communication with the second external terminal 20-2 by using the second network identifier (SSID2) and then starts the second network ("network 2") based on the second network identifier (SSID2) to be in a communicable state for the second external terminal 20-2 on a higher layer than a layer in which the logical link of the communication is established. Then, the generation unit 152c causes the first communication module 13 to transmit the second network identifier (SSID2) to the second external terminal 20-2 by using the first communication protocol.

After starting the first network described above, the second communication module 14a suspends the first network and starts the second network in a case where the first communication module 13 receives a connection request and the second terminal-specifying information from the second external terminal 20-2. The other processes of the second communication module 14a are similar to those of the second communication module 14 according to the first embodiment.

Next, the operation of the wireless communication system 1c according to the present embodiment will be described with reference to FIG. 13.

Figure 13:
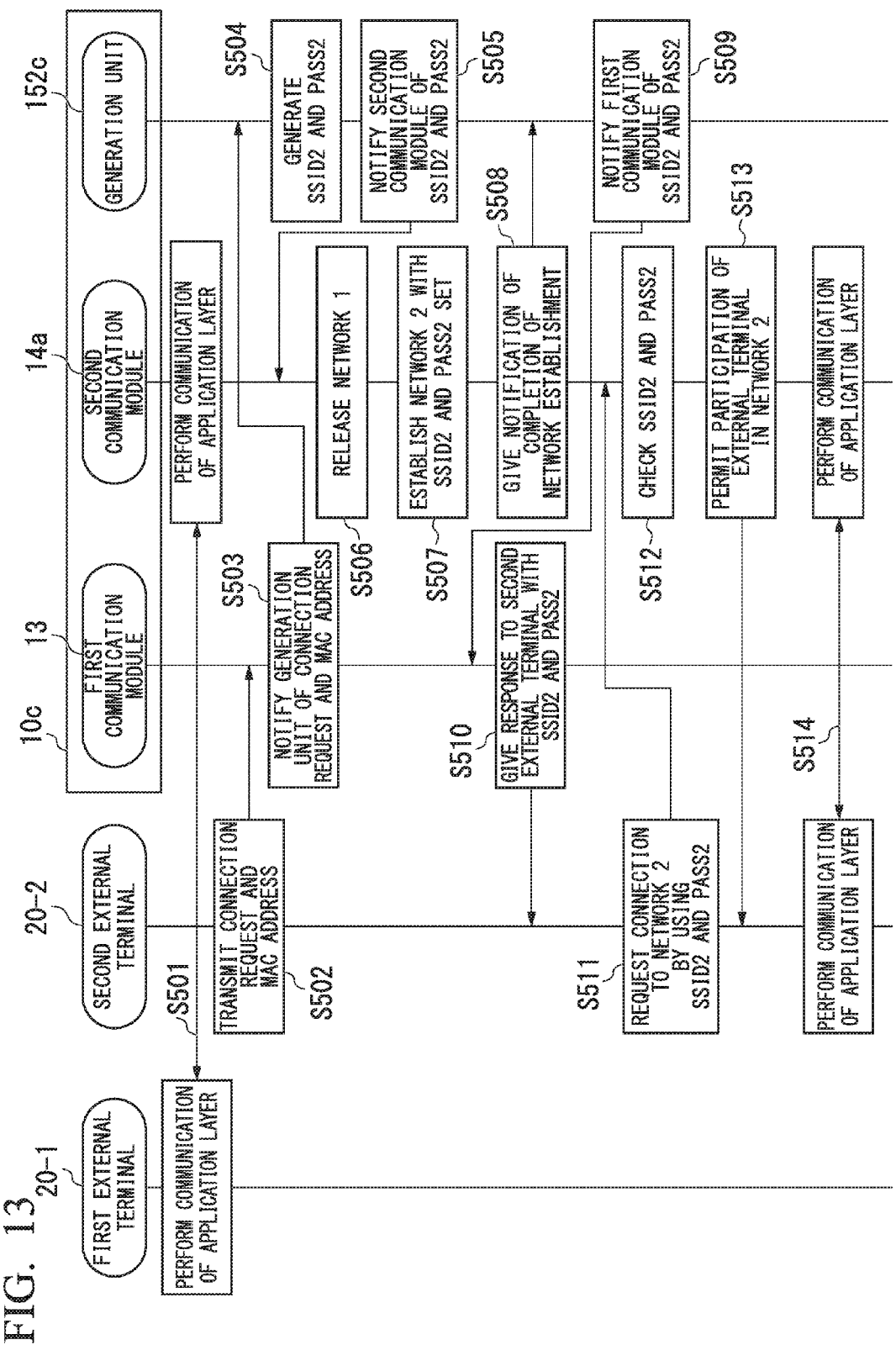
FIG. 13 is a diagram illustrating an example of the operation of the wireless communication system according to the fourth embodiment.

FIG. 13 is a diagram illustrating an example of the operation of the wireless communication system 1c according to the present embodiment.

In the example illustrated in FIG. 13, it is assumed that the imaging terminal 10c has already started the first network ("network 1") by using the first network identifier (SSID1) and the password (PASS1). Then, the first external terminal 20-1 is assumed to be connected to the first network ("network 1") and perform communication of an application layer by using the second communication protocol (Step S501).

Next, the second external terminal 20-2 transmits a connection request and a MAC address (Step S502). In other words, the terminal control unit 25 of the second external terminal 20-2, for example, in accordance with a user's operation for the operation unit 21, acquires the MAC address of the first communication module 23 as terminal-specifying information and causes the first communication module 23 to transmit a connection request and the MAC address as illustrated in FIG. 3.

Next, the first communication module 13 of the imaging terminal 10c notifies the generation unit 152c of the control unit 15c of the connection request and the MAC address received from the external terminal 20 (Step S503).

Next, the generation unit 152c generates an SSID2 (network identifier) and a password (PASS2) based on the MAC address received by the first communication module 13 (Step S504). The generation unit 152c generates SSID2 and PASS2 based on the MAC address of the second external terminal 20-2, for example, by using Equation (1) and Equation (2) described above.

Next, the generation unit 152c notifies the second communication module 14a of SSID2 and PASS2 (Step S505).

Next, the second communication module 14a, first, suspends the first network ("network 1") (Step S506). In other words, the second communication module 14a suspends the connection with the first external terminal 20-1 using the second communication protocol. Accordingly, the communication of the application layer between the first external terminal 20-1 and the imaging terminal 10c ends.

Next, the second communication module 14a establishes a second network (for example, "network 2") by setting SSID2 and PASS2 generated by the generation unit 152c (Step S507). In other words, the second communication module 14a starts "network 2" to be in a connectable state by using SSID2 and PASS2.

In this way, after releasing "network 1", the generation unit 152c causes the second communication module 14a to start "network 2" by using SSID2 (network identifier).

Next, the second communication module 14a notifies the generation unit 152c of the completion of the establishment of "network 2" (Step S508).

Next, the generation unit 152c notifies the first communication module 13 of SSID2 and PASS2 (Step S509).

Next, the first communication module 13 responds to the second external terminal 20-2 with SSID2 and PASS2 generated by the generation unit 152c (Step S510).

In this way, after releasing "network 1", the generation unit 152c causes the first communication module 13 to transmit SSID2 (network identifier) and PASS2 (password) that are generated to the second external terminal 20-2 by using the first communication protocol.

Next, the second external terminal 20-2 requests a connection for "network 2" by using SSID2 and PASS2 that are received (Step S511). The terminal control unit 25 of the second external terminal 20-2 requests the second communication module 24 to be connected to "network 2" by using SSID2 and PASS2.

Next, the second communication module 14a checks SSID2 and PASS2 in response to the request from the second external terminal 20-2 (Step S512).

Next, the second communication module 14a permits the second external terminal 20-2 to participate in "network 2" (Step S513).

Then, communication of an application layer is performed between the imaging terminal 10c and the second external terminal 20-2 (Step S514). Accordingly, the second external terminal 20-2, for example, is enabled to acquire a live image from the imaging terminal 10c by using the second communication protocol and display the acquired live image on the display unit 22 or is enabled to transmit an imaging instruction to the imaging terminal 10c by using the second communication protocol.

In the example described above, while an example in which the second communication module 14a suspends "network 1" in accordance with the reception of SSID2 and PASS2 from the generation unit 152c has been described, the generation unit 152c may be configured to cause the second communication module 14a to suspend "network 1" before transmission of SSID2 and PASS2 to the second communication module 14a.

As described above, in the wireless communication system 1c according to the present embodiment, the external terminal 20 includes the first external terminal 20-1 and the second external terminal 20-2 different from the first external terminal 20-1. For example, in a case where the first communication module 13 receives a connection request and the first terminal-specifying information used for specifying the first external terminal 20-1 from the first external terminal 20-1, the generation unit 152c generates a first network identifier (SSID1) used for identifying the first network based on the first terminal-specifying information. The generation unit 152c causes the second communication module 14a to establish a logical link of communication with the first external terminal 20-1 by using the first network identifier (SSID1) and then starts the first network ("network 1") based on the first network identifier (SSID1) to be in a communicable state for the first external terminal 20-1 on a higher layer than a layer in which the logical link of the communication is established. Then, the generation unit 152c causes the first communication module 13 to transmit the first network identifier (SSID1) to the first external terminal 20-1 by using the first communication protocol.

For example, in a case where the first communication module 13 receives a connection request and the second terminal-specifying information used for specifying the second external terminal 20-2 from the second external terminal 20-2, the generation unit 152c generates a second network identifier (SSID2), which is a second network identifier used for identifying the second network based on the second terminal-specifying information, different from the first network identifier (SSID1). The generation unit 152c causes the second communication module 14a to establish a logical link of communication with the second external terminal 20-2 by using the second network identifier (SSID2) and then starts the second network ("network 2") based on the second network identifier (SSID2) to be in a communicable state for the second external terminal 20-2 on a higher layer than a layer in which the logical link of the communication is established. Then, the generation unit 152c causes the first communication module 13 to transmit the first network identifier (SSID1) to the first external terminal 20-1 by using the first communication protocol.

In this way, the imaging terminal 10c according to the present embodiment can prevent an unintended connection from an external terminal 20 to the imaging terminal 10c for a plurality of connectable external terminals 20.

In the present embodiment, after starting the first network (for example, "network 1"), the second communication module 14a suspends the first network and starts the second network (for example, "network 2") in a case where the first communication module 13 receives a connection request and the second terminal-specifying information from the second external terminal 20-2.

In this way, the imaging terminal 10c according to the present embodiment, in a case where the first external terminal 20-1 is unintentionally connected to the imaging terminal 10c, can connect the second external terminal 20-2 to the imaging terminal 10c without operating the first external terminal 20-1. In other words, the imaging terminal 10c according to the present embodiment can perform appropriate switching among the plurality of external terminals 20 to be used.

(Fifth Embodiment)

Next, a wireless communication system 1c according to a fifth embodiment will be described with reference to the drawings.

In the present embodiment, a modified example of a case where connection switching among a plurality of external terminals 20 is performed in the fourth embodiment described above will be described.

The configuration of the wireless communication system 1c according to the present embodiment is similar to that of the fourth embodiment described above, and thus, the description thereof will not be presented here.

In the present embodiment, after starting the first network ("network 1"), in a case where the first communication module 13 receives a connection request and the second terminal-specifying information from the second external terminal 20-2, after the first network ("network 1") is suspended in response to a suspend request for the first network from the first external terminal 20-1, the second communication module 14a starts the second network ("network 2").

Next, the operation of the wireless communication system 1c according to the present embodiment will be described with reference to FIG. 14.

Figure 14:
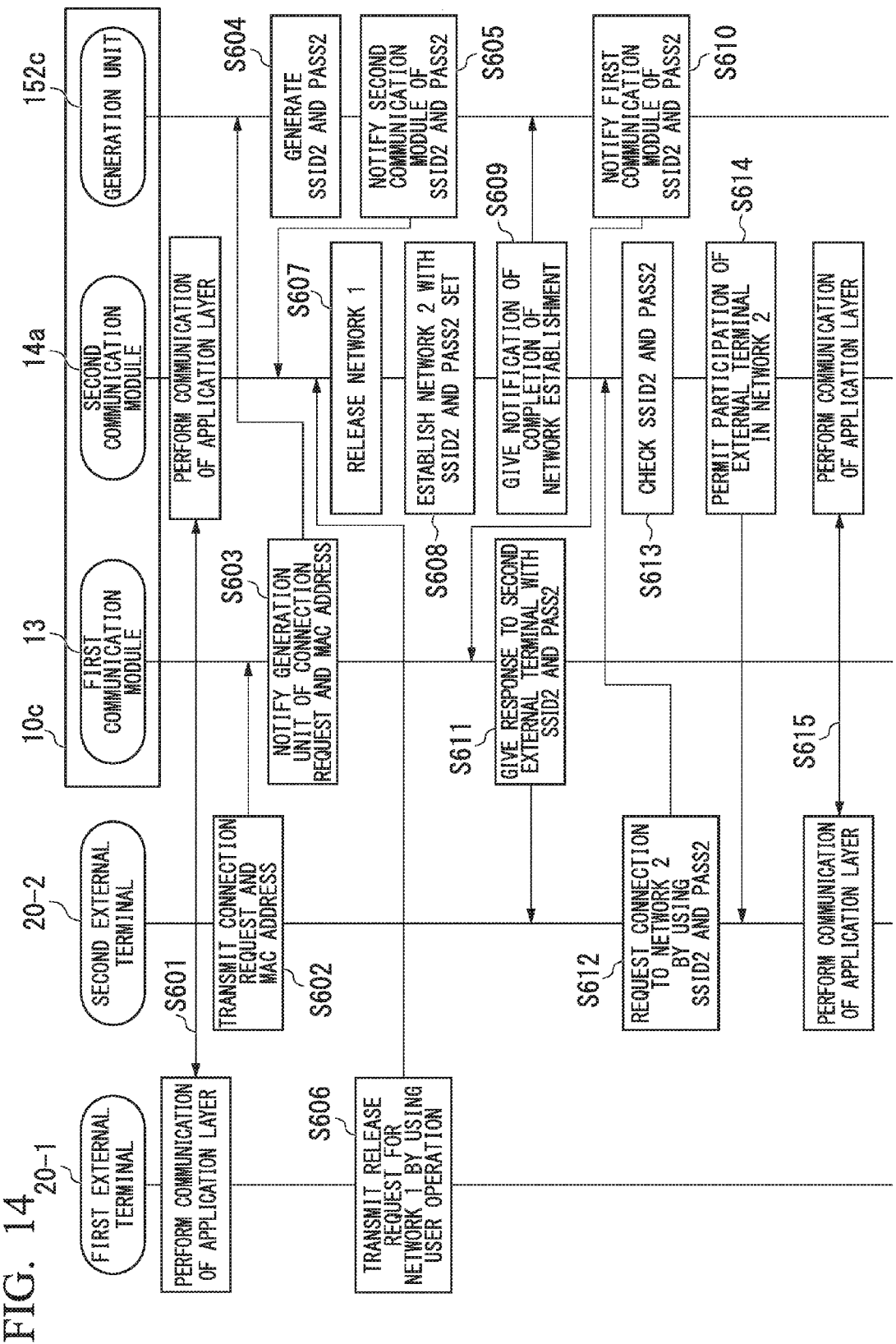
FIG. 14 is a diagram illustrating an example of the operation of a wireless communication system according to a fifth embodiment.

FIG. 14 is a diagram illustrating an example of the operation of the wireless communication system 1c according to the present embodiment.

In the example illustrated in FIG. 14, similar to the example illustrated in FIG. 13, it is assumed that the imaging terminal 10c has already started the first network ("network 1") by using the first network identifier (SSID1) and the password (PASS1). Then, the first external terminal 20-1 is assumed to be connected to the first network ("network 1") and perform communication of an application layer by using the second communication protocol (Step S601).

The process of Steps S602 to S605 is similar to the process of Steps S502 to S505 illustrated in FIG. 13 described above, and thus the description thereof will not be presented here.

In the present embodiment, also in a case where SSID2 and PASS2 are received from the generation unit 152c, the second communication module 14a does not immediately suspend "network 1" but waits for a suspend instruction (suspend request) from the first external terminal 20-1.

Next, the first external terminal 20-1 transmits a suspend request for "network 1" to the second communication module 14a in accordance with a user's operation (Step S606). In other words, the terminal control unit 25 of the first external terminal 20-1 causes the second communication module 24 to transmit a suspend request for "network 1" to the second communication module 24 in accordance with a user's operation for the operation unit 21.

Next, the second communication module 14a suspends "network 1" in response to the suspend request for "network 1" (Step S607). In other words, the second communication module 14a suspends the connection with the first external terminal 20-1 using the second communication protocol. In this way, the communication of the application layer between the first external terminal 20-1 and the imaging terminal 10c ends.

The process of following Steps S608 to S615 is similar to the process of Steps S507 to S614 illustrated in FIG. 13 described above, and thus the description thereof will not be presented here.

In the example described above, while an example in which the second communication module 14a suspends "network 1" in response to the suspend request for the first network from the first external terminal 20-1 has been described, the generation unit 152c may cause the second communication module 14a to suspend "network 1" in response to a suspend request for the first network from the first external terminal 20-1.

As described above, in the present embodiment, after the first network ("network 1") is started, in a case where the first communication module 13 receives a connection request and the second terminal-specifying information from the second external terminal 20-2, the second communication module 14a starts the second network ("network 2") after the first network is suspended in response to the suspend request for the first network from the first external terminal 20-1.

Accordingly, for example, in a case where different users own external terminals 20 and share one imaging terminal 10c, the imaging terminal 10c according to the present embodiment waits for the completion of a user's operation connected first and then, is connected to the external terminal 20 of a user. For this reason, the imaging terminal 10c according to the present embodiment can prevent an unintended abrupt disconnection of a network from an external terminal 20. In other words, the imaging terminal 10c according to the present embodiment can prevent the suspension of communication that is performed regardless of a user's intention.

(Sixth Embodiment)

Next, a wireless communication system 1c according to a sixth embodiment will be described with reference to the drawings.

In the present embodiment, a modified example of a case where connection switching among a plurality of external terminals 20 is performed in the fourth and fifth embodiments described above will be described.

The configuration of the wireless communication system 1c according to the present embodiment is similar to that of the fourth embodiment described above, and thus, the description thereof will not be presented here.

In the present embodiment, after starting the first network ("network 1"), in a case where the first communication module 13 receives a connection request and the second terminal-specifying information from the second external terminal 20-2, the second communication module 14a transmits a suspend request for the first network ("network 1") to the first external terminal 20-1. The second communication module 14a suspends the first network based on a determination result regarding whether a suspend request is applicable received from the first external terminal 20-1. Then, after releasing the first network, the second communication module 14a starts the second network ("network 2") by using the second network identifier (SSID2) and the password (PASS2) generated by the generation unit 152c.

After starting the first network ("network 1"), the generation unit 152c according to the present embodiment notifies the second external terminal 20-2 of information representing that the first network ("network 1") is in the middle of operation in a case where the first communication module 13 receives a connection request and the second terminal-specifying information from the second external terminal 20-2. In other words, the generation unit 152c notifies the second external terminal 20-2 that the first external terminal 20-1 is in the middle of connection. Information representing that the first network ("network 1") is in the middle of operation includes identification information (for example, a terminal name or the like) used for identifying the first external terminal 20-1.

In the present embodiment, the imaging terminal 10c needs to notify the second external terminal 20-2 that the first external terminal 20-1 is in the middle of connection. For this reason, the external terminal 20, for example, as illustrated in FIG. 15, adds the terminal name to the connection request and the terminal-specifying information and transmits resultant information to the imaging terminal 10c by using the first communication protocol.

FIG. 15 is a diagram illustrating an example of data of a connection request and terminal-specifying information according to the present embodiment.

In the example illustrated in FIG. 15, the connection request is a command of "REQUEST_CONNECTION", and the terminal-specifying information is "12:34:56:78:9A:BC" (MAC address). The terminal name is illustrated as "PHONE1". For example, the first external terminal 20-1 transmits data as illustrated in FIG. 15 to the imaging terminal 10c.

Next, the operation of the wireless communication system 1c according to the present embodiment will be described with reference to FIG. 16.

Figure 16:
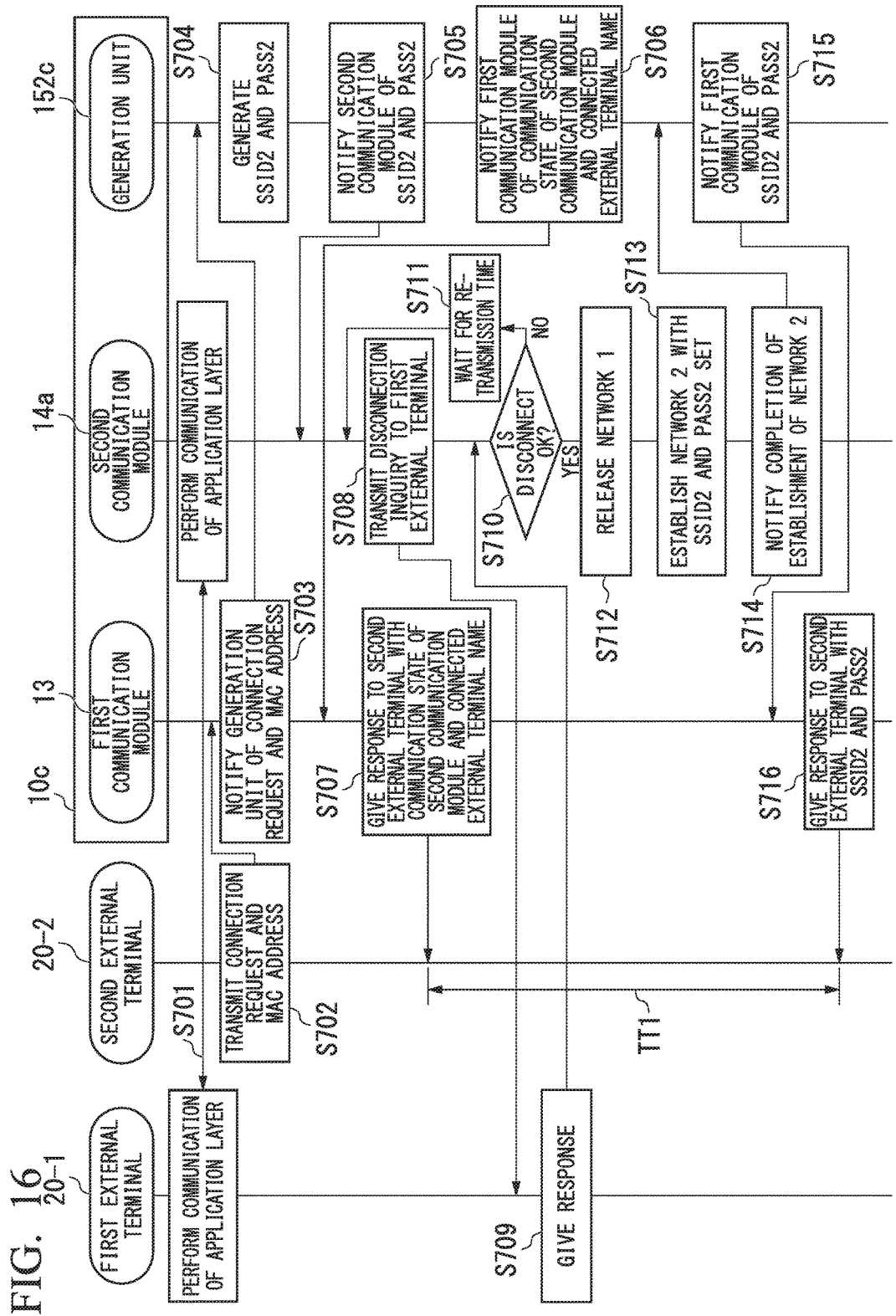
FIG. 16 is a diagram illustrating an example of the operation of the wireless communication system according to the sixth embodiment.

FIG. 16 is a diagram illustrating an example of the operation of the wireless communication system 1c according to the present embodiment.

In the example illustrated in FIG. 16, similar to the example illustrated in FIG. 13, in the imaging terminal 10c, the first network ("network 1") is assumed to have been already started using the first network identifier (SSID1) and the password (PASS1). The first external terminal 20-1 is assumed to be connected to the first network ("network 1") and perform communication of the application layer using the second communication protocol (Step S701).

The process of Steps S702 to S705 is similar to the process of Steps S502 to S505 illustrated in FIG. 13 described above, and the description thereof will not be presented here.

Figures 17, 18:
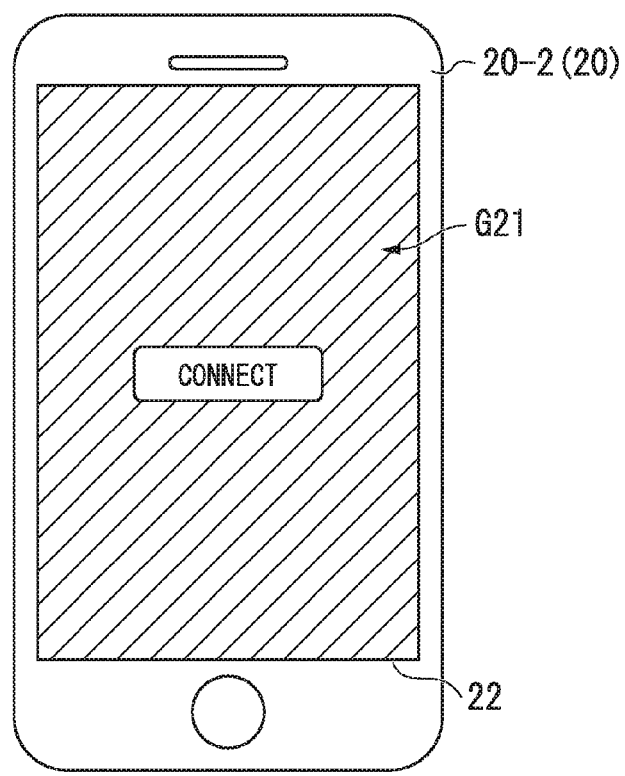
FIG. 17 is a first diagram illustrating a display example of a second external terminal according to the sixth embodiment.
FIG. 18 is a diagram illustrating an example of data of a communication status notification according to the sixth embodiment.

In the present embodiment, in Step S702, for example, when a camera application is started in accordance with a user operation, the second external terminal 20-2, as illustrated in FIG. 17, displays a connect button ("CONNECT" button) on the display unit 22.

FIG. 17 is a first diagram illustrating a display example of the second external terminal 20-2 according to the present embodiment.

In this drawing, a screen G21 illustrates an example in which the connect button ("CONNECT" button) is displayed at the time of starting a camera application.

As a user presses (taps) the connect button ("CONNECT" button) described above, the second external terminal 20-2 transmits a connection request including a terminal name (external terminal name) and a MAC address as illustrated in FIG. 15 to the first communication module 13.

Next, the generation unit 152c notifies the first communication module 13 of the communication state of the second communication module 14a and a connected external terminal name (Step S706).

Next, the first communication module 13, as illustrated in FIG. 18, responds to the second external terminal 20-2 with the communication state of the second communication module 14a and the connected external terminal name (Step S707).

FIG. 18 is a diagram illustrating an example of data of a communication status notification according to the present embodiment.

In the example illustrated in FIG. 18, the communication status notification is illustrated as a command of "NOTIFY_STATUS", and the communication module name is illustrated as "MODULE2". The communication state is illustrated as "CONNECTED" (in the middle of connection), and the terminal name is illustrated as "PHONE1". Here, "MODULE2" represents the communication module name of the second communication module 14a, and "PHONE1" represents the first external terminal 20-1.

Figure 19:
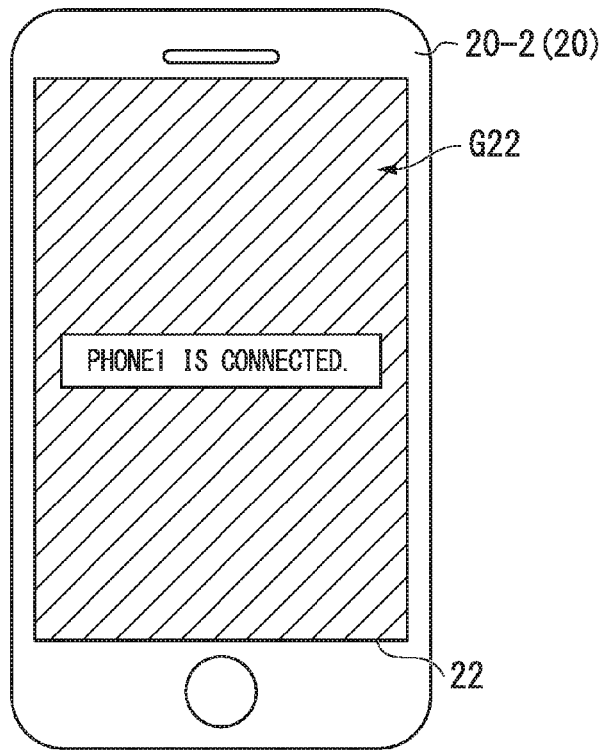
FIG. 19 is a second diagram illustrating a display example of the second external terminal according to the sixth embodiment.

In a case where the communication status notification as illustrated in FIG. 18 is received, the second external terminal 20-2, for example, displays a screen G22 as illustrated in FIG. 19 on the display unit 22.

FIG. 19 is a second diagram illustrating a display example of the second external terminal 20-2 according to the present embodiment.

In the drawing, the screen G22 illustrates an example in which "PHONE' IS CONNECTED" representing that the first external terminal 20-1 is in the middle of connection is displayed on the screen of a camera application.

Referring back to FIG. 16, next, the second communication module 14a notifies the first external terminal 20-1 of a disconnection inquiry (Step S708). For example, the second communication module 14a, for example, notifies the first external terminal 20-1 of a command of "CONFIRM DISCONNECT" as a disconnection inquiry.

Next, the first external terminal 20-1 gives a response relating to the disconnection inquiry to the second communication module 14a (Step S709). Here, in a case where a disconnection inquiry is received, the first external terminal 20-1, for example, displays a screen G11 as illustrated in FIG. 20 on the display unit 22.

Figure 20:
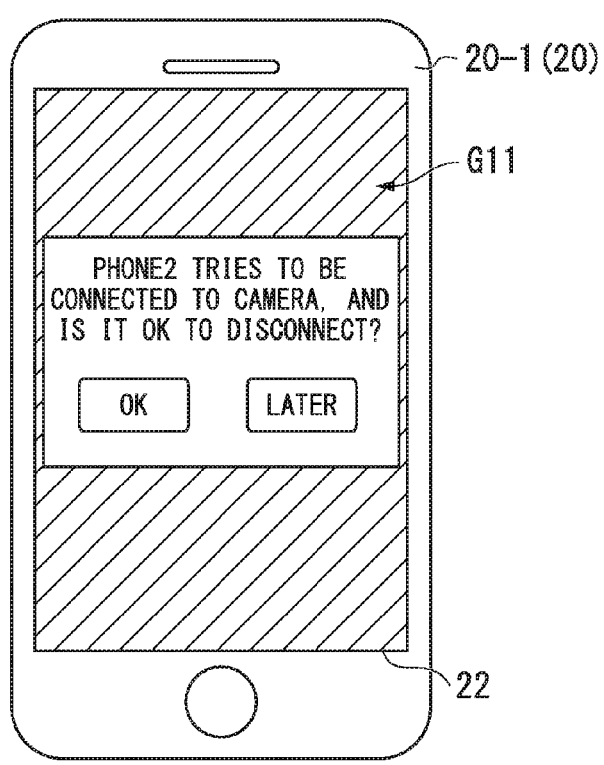
FIG. 20 is a first diagram illustrating a display example of a first external terminal according to the sixth embodiment.

FIG. 20 is a first diagram illustrating a display example of the first external terminal 20-1 according to the present embodiment.

In this diagram, the screen G11 illustrates an example of a disconnection inquiry screen on the screen of a camera application.

In a case where "OK" is selected by a user on the screen G11 illustrated in FIG. 20, the first external terminal 20-1 gives a response of "OK (disconnection permission)" to the second communication module 14a.

Figures 21, 22:
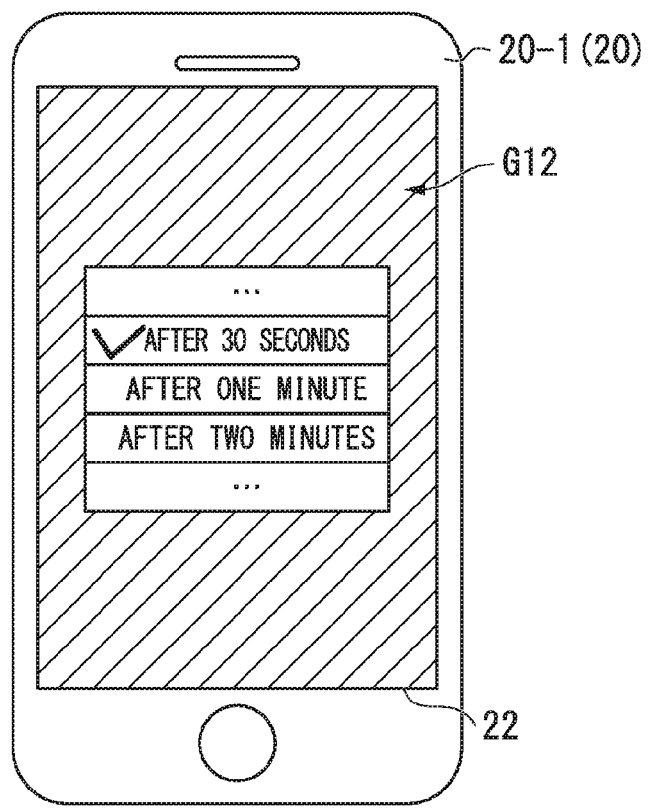
FIG. 21 is a second diagram illustrating a display example of the first external terminal according to the sixth embodiment.
FIG. 22 is a diagram illustrating an example of data of a response to a disconnection inquiry according to the sixth embodiment.

On the other hand, in a case where "LATER" is selected by the user on the screen G11 illustrated in FIG. 20, the first external terminal 20-1 displays a screen G12, for example, as illustrated in FIG. 21 on the display unit 22.

FIG. 21 is a second diagram illustrating a display example of the first external terminal 20-1 according to the present embodiment.

In this drawing, a screen G12 illustrates an example of a retransmission request interval selection screen on the screen of a camera application.

For example, in a case where "AFTER 30 SECONDS" is selected by the user on the screen G12 illustrated in FIG. 21, the first external terminal 20-1 gives a response as illustrated in FIG. 22 to the second communication module 14a.

FIG. 22 is a diagram illustrating an example of data of a response to a disconnection inquiry according to the present embodiment.

In the example illustrated in FIG. 22, the response relating to the disconnection inquiry is illustrated as a command of "TRY_AGAIN" (retransmission request), and a retransmission interval [sec (seconds)] is illustrated as "30".

Again, referring back to FIG. 16, the second communication module 14a determines whether or not the response is disconnection OK (disconnection permission) in accordance with the response from the first external terminal 20-1 (Step S710). In a case where the response is disconnection OK (disconnection permission) (Step S710: Yes), the second communication module 14a causes the process to proceed to Step S712. On the other hand, in a case where the response is not disconnection OK (disconnection permission) (Step S710: No), the second communication module 14a waits (Step S711) for a retransmission time (retransmission interval) and returns the process to Step S708.

The process of following Steps S712 to S716 is similar to the process of Steps S506 to S510 illustrated in FIG. 13, and thus, the description thereof will not be presented here. In a case where SSID2 and PASS2 are received in Step S716, the second external terminal 20-2 displays a screen G23, for example, as illustrated in FIG. 23 on the display unit 22.

Figure 23:
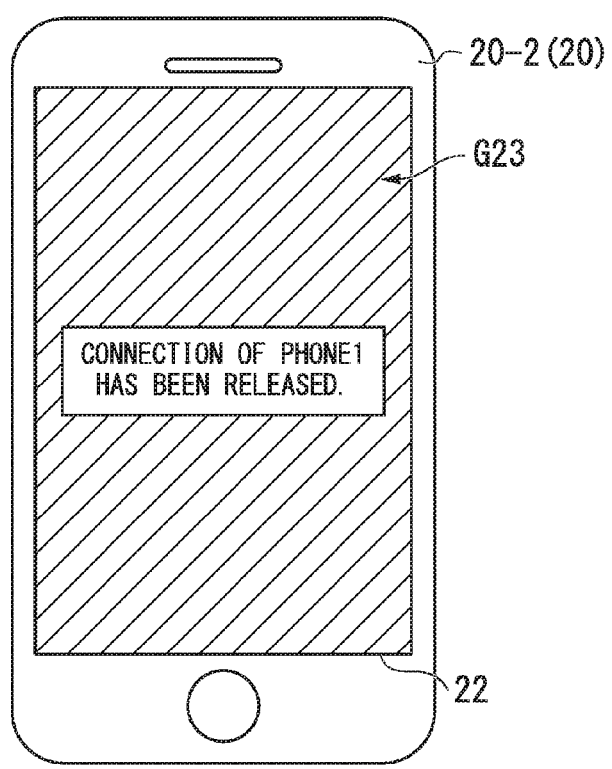
FIG. 23 is a third diagram illustrating a display example of the second external terminal according to the sixth embodiment.

FIG. 23 is a third diagram illustrating a display example of the second external terminal 20-2 according to this sixth embodiment.

In this drawing, a screen G23 illustrates an example in which the suspension of the connection of the first external terminal 20-1 is displayed on the screen of a camera application.

The process of Step S716 and subsequent steps is similar to the process of Steps S612 to S615 illustrated in FIG. 14, and thus, the description thereof will not be presented here.

In the present embodiment described above, in a period 111 illustrated in FIG. 16, the second external terminal 20-2 may maintain the display of the screen G22 illustrated in FIG. 19.

Furthermore, the second external terminal 20-2 may move the camera application to the background to allow another application to be used. In such a case, when SSID2 and PASS2 are received in Step S716, the second external terminal 20-2 may display a screen G24, for example, as illustrated in FIG. 24 on the display unit 22.

Figure 24:
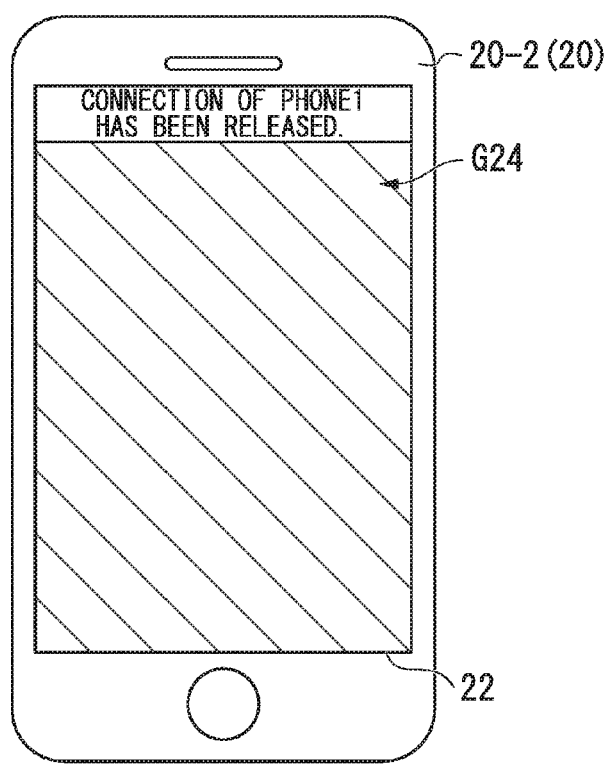
FIG. 24 is a fourth diagram illustrating a display example of the second external terminal according to the sixth embodiment.

FIG. 24 is a fourth diagram illustrating a display example of the second external terminal 20-2 according to the present embodiment.

In this drawing, a screen G24 illustrates an example in which the suspension of the connection of the first external terminal 20-1 is displayed on the screen of an application other than the camera application.

The second communication module 14a may set an upper limit of the number of retransmission requests and an upper limit of a total time consumed in the retransmission interval in advance and forcibly disconnect the first network ("network 1") in a case where the number of retransmission requests exceeds the upper limit, or the total time exceeds the upper limit.

In the present embodiment described above, while an example in which the second communication module 14a suspends the "network 1" or re-transmits a disconnection inquiry in accordance with a response relating to the disconnection inquiry from the first external terminal 20-1 has been described, the generation unit 152c may be configured to perform a process of determining a response relating to the disconnection inquiry. In a case where the disconnection inquiry is transmitted or re-transmitted to the first external terminal 20-1, the generation unit 152c may cause the second communication module 14a to transmit or re-transmit a disconnection inquiry.

In the present embodiment described above, while an example in which the first external terminal 20-1 transmits a response relating to a disconnection inquiry in accordance with a user's operation has been described, the transmission of a response is not limited thereto. For example, the first external terminal 20-1 may be configured to automatically transmit a response in accordance with conditions set in advance. Here, as the conditions, for example, in a camera application, disconnection is not permitted in a case where a process requiring a time is in the middle of execution such as in the middle of transmission of an image.

As described above, in the present embodiment, after the first network ("network 1") is started, in a case where the first communication module 13 receives a connection request and the second terminal-specifying information from the second external terminal 20-2, the generation unit 152c notifies the second external terminal 20-2 of information representing that the first network ("network 1") is in the middle of operation.

In this way, since the imaging terminal 10c according to the present embodiment notifies the second external terminal 20-2 of being in the middle of a connection with other external terminal 20 (for example, the first external terminal 20-1), the user can recognize whether or not the reason for not connecting is a connection with other external terminal 20.

In the present embodiment, the information representing the first network ("network 1") being in the middle of operation includes identification information (for example, a terminal name) used for identifying the first external terminal 20-1.

Accordingly, the imaging terminal 10c according to the present embodiment can specify an external terminal 20 that is in the middle of communication, and thus, a user can manually suspend the connection or request a user using the external terminal 20 (the first external terminal 20-1) that is in the middle of communication to suspend the connection.

In the present embodiment, after the first network ("network 1") is started, in a case where the first communication module 13 receives a connection request and the second terminal-specifying information from the second external terminal 20-2, the second communication module 14a transmits a suspend request for the first network ("network 1") to the first external terminal 20-1. Then, the second communication module 14a suspends the first network based on a determination result regarding whether the suspend request is applicable received from the first external terminal 20-1.

Accordingly, the imaging terminal 10c according to the present embodiment can suspend the connection of the first network ("network 1") in accordance with explicit intention of the user using the first external terminal 20-1.

The present invention is not limited to each embodiment described above, but changes can be made therein in a range not departing from the concept of the present invention.

For example, while examples in which each of the embodiments described above is independently performed have been described, the embodiments described above may be combined together.

In each embodiment described above, while an example in which each of the terminal-specifying information and the own apparatus-specifying information is a MAC address has been described, the information is not limited thereto. Each of the terminal-specifying information and the own apparatus information may be a universally unique identifier (UUID) of BLE, a serial number (production number) of a smartphone, the telephone number of a smartphone, or the like other than the MAC address.

While an example in which the generation unit 152 (152a to 152c) generates a network identifier (SSID) by using Equation (1) or Equation (4) has been described, the method of generating the network identifier is not limited thereto. The generation unit 152 (152a to 152c) may generate a network identifier, for example, based on a lookup table used for uniquely converting terminal-specifying information into a corresponding network identifier. The generation unit 152 (152a to 152c) may use the terminal-specifying information as a network identifier.

Furthermore, in order to improve the discriminability of the network identifier, the generation unit 152 (152a to 152c) may use an identifier acquired by adding a user-specific prefix or suffix to a value or a hash value using the terminal-specifying information as a network identifier. For example, in a case where a hash value is "nEwvIgWUJ0xa", the generation unit 152 (152a to 152c) may generate "mycamera-nEwvIgWUJ0xa" or the like as a network identifier by using "mycamera-" as a prefix.

While an example in which the generation unit 152 (152a to 152c) generates a password (PASS) by using Equation (2), Equation (3), or Equation (5) has been described, the generation of the password is not limited thereto. The generation unit 152 (152a to 152c), for example, may generate a password (PASS) by using a method completely independent from the network identifier such as generation of a password (PASS) from a random number acquired by using time as the seed In the fourth to sixth embodiments described above, in a case where the first external terminal 20-1 desires to use communication using the second communication network to have high priority, the imaging terminal 10c may be configured to have a locking function not accepting a connection request from the second external terminal 20-2. Furthermore, in such a case, the imaging terminal 10c may notify the second external terminal 20-2 of information representing that communication using the second communication protocol is locked by the first external terminal 20-1 to display the information on the display unit 22 of the second external terminal 20-2.

In the fifth and sixth embodiments described above, the imaging terminal 10c may accept connection requests from two or more second external terminals 20-2 as connection reservations and make a connection to each second external terminal 20-2 by using the second communication protocol in order of the acceptance of the connection request. Furthermore, in such a case, the imaging terminal 10c may transmit information of the connection order or the like to the second external terminals 20-2 to display the information on the display unit 22 of each of the second external terminals 20-2.

In each embodiment described above, while an example in which the wireless communication terminal is the imaging terminal 10 (10a to 10c) has been described, the wireless communication terminal is not limited thereto. The wireless communication terminal may be any other wireless communication terminal.

In each embodiment described, while an example in which the external terminal 20 (20-1, 20-2, 20a, or 20b) is a mobile phone such as a smartphone has been described, the external terminal is not limited thereto. The external terminal 20 (20-1, 20-2, 20a, or 20b), for example, may be a mobile information terminal such as a personal digital assistant (PDA) or a tablet terminal or a PC having a wireless communication interface.

The first communication protocol and the second communication protocol are not limited to the ones described in each embodiment. For example, the first communication protocol and the second communication protocol may be protocols of other wireless communications such as near field wireless communication (NFC) or infrared communication.

Each configuration included the wireless communication system 1 (1a to 1c) described above includes a computer system therein. Then, by recording a program used for realizing the function of each configuration included in the wireless communication system 1 (1a to 1c) described above on a computer-readable recording medium and causing the computer system to read and execute the program recorded on this recording medium, the process of each configuration included in the wireless communication system 1 (1a to 1c) described above may be performed. Here, "the computer system is caused to read and execute the program recorded on the recording medium" includes a case where the computer system is caused to install the program in the computer system. The "computer system" described here includes an OS and hardware such as peripherals.

The "computer system" may include a plurality of computer apparatuses connected through a network including the Internet, a WAN, a LAN or a communication line such as a dedicated line. Furthermore, the "computer-readable recording medium" represents a portable medium such as a flexible disc, a magneto-optical disk, a ROM, or a CD-ROM or a storage device such as a hard disk built in the computer system. In this way, the recording medium in which the program is stored may be a non-transient recording medium such as a CD-ROM.

The recording medium includes a recording medium installed inside or outside that is accessible from a distribution server for distributing the program. Furthermore, a configuration in which the program is divided into a plurality of parts, and the parts are downloaded at different timings and then are combined in each configuration included in the wireless communication system 1 (1a to 1c) may be employed, and distribution servers distributing the divided programs may be different from each other. The "computer-readable recording medium" includes a medium storing the program for a predetermined time such as an internal volatile memory (RAM) of a computer system serving as a server or a client in a case where the program is transmitted through a network. Furthermore, the program described above may be a program used for realizing apart of the function described above. The program may be a program to be combined with a program that has already been recorded in the computer system for realizing the function described above, a so-called a differential file (differential program).

Apart or all of the functions described above may be realized by an integrated circuit of a large-scale integration (LSI) or the like. Each function described above may be individually configured as a processor, or a part or all of the functions may be integrated and configured as a processor. Technique used for configuring the integrated circuit is not limited to the LSI, and each function may be realized by a dedicated circuit or a general-purpose processor. Furthermore, in a case where a technology of configuring an integrated circuit replacing the LSI emerges in accordance with the process of semiconductor technologies, an integrated circuit using such a technology may be used.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A wireless communication terminal, comprising:
   a first communication module performing wireless communication with an external terminal by using a first communication protocol;
   a second communication module performing wireless communication with the external terminal by using a second communication protocol; and
   a generation unit,
   wherein in a situation in which the first communication module receives a connection request requesting a connection and terminal-specifying information specifying the external terminal from the external terminal by using the first communication protocol,
      the generation unit generates a network identifier based on the terminal-specifying information, the network identifier being used for identifying a network using the second communication protocol,
      the generation unit causes the second communication module to establish a logical link of communication with the external terminal by using the network identifier, and
      the generation unit subsequently causes the second communication module to start the network based on the network identifier such that the network is in a communicable state for the external terminal on a higher layer than a layer in which the logical link of the communication is established.

2. The wireless communication terminal according to claim 1, wherein the generation unit causes the first communication module to transmit the generated network identifier to the external terminal by using the first communication protocol.

3. The wireless communication terminal according to claim 1, wherein the generation unit generates a password used for a connection to the network while generating the network identifier, and the generation unit causes the first communication module to transmit the network identifier and the password to the external terminal by using the first communication protocol.

4. The wireless communication terminal according to claim 1, wherein the generation unit suspends a start-up of the network by the second communication module during a period from a time power is supplied to the wireless communication terminal until the first communication module receives the connection request.

5. The wireless communication terminal according to claim 1, wherein before the first communication module receives the terminal-specifying information, the generation unit causes the second communication module to start the network based on the network identifier that is generated based on the previously received terminal-specifying information.

6. The wireless communication terminal according to claim 1, wherein the generation unit generates the network identifier based on the terminal-specifying information and own apparatus-specifying information used for specifying the wireless communication terminal.

7. The wireless communication terminal according to claim 1, further comprising a storage unit storing first authentication information used for authenticating the external terminal,
   wherein the generation unit determines whether or not to start the network based on the first authentication information stored in the storage unit and second authentication information received from the external terminal by the first communication module.

8. The wireless communication terminal according to claim 1,
   wherein the first communication protocol is a communication protocol capable of being applied to one-to-many communication connections, and
   wherein the second communication protocol is a communication protocol only capable of being applied to a one-to-one communication connection.

9. The wireless communication terminal according to claim 1, wherein the external terminals include a first external terminal and a second external terminal different from the first external terminal, and wherein in a situation in which the first communication module receives a connection request and first terminal-specifying information specifying the first external terminal from the first external terminal, the generation unit generates a first network identifier based on the first terminal-specifying information, the first network identifier being used for identifying a first network using the second communication protocol, the generation unit causes the second communication module to establish a logical link of communication with the first external terminal by using the first network identifier, and the generation unit subsequently causes the second communication module to start the first network based on the first network identifier such that the first network is in a communicable state for the first external terminal on a higher layer than a layer in which the logical link of the communication is established, while the generation unit causing the first communication module to transmit the first network identifier to the first external terminal by using the first communication protocol, and wherein in a situation in which the first communication module receives the connection request and second terminal-specifying information specifying the second external terminal from the second external terminal, the generation unit generates a second network identifier based on the second terminal-specifying information, the second network identifier being different from the first network identifier, and the second network identifier being used for identifying a second network using the second communication protocol, the generation unit causes the second communication module to establish a logical link of communication with the second external terminal by using the second network identifier, and the generation unit subsequently causes the second communication module to start the second network based on the second network identifier such that the second network is in a communicable state for the second external terminal on a higher layer than a layer in which the logical link of the communication is established, while the generation unit causing the first communication module to transmit the second network identifier to the second external terminal by using the first communication protocol.

10. The wireless communication terminal according to claim 9, wherein after the second communication module starts the first network and in a situation in which the first communication module receives the connection request and the second terminal-specifying information from the second external terminal, the second communication module suspends the first network and the second communication module starts the second network.

11. The wireless communication terminal according to claim 9, wherein after the second communication module starts the first network and in a situation in which the first communication module receives the connection request and the second terminal-specifying information from the second external terminal, the second communication module suspends the first network in response to a suspend request for the first network from the first external terminal, and the second communication module subsequently starts the second network.

12. The wireless communication terminal according to claim 9, wherein after the second communication module starts the first network and in a situation in which the first communication module receives a connection request and the second terminal-specifying information from the second external terminal, the second communication module transmits a suspend request for the first network to the first external terminal, and the second communication module subsequently suspends the first network based on a determination result regarding whether the suspend request is applicable, the determination result being received from the first external terminal.

13. The wireless communication terminal according to claim 9, wherein after the generation unit causes the second communication module to start the first network and in a case in which the first communication module receives a connection request and the second terminal-specifying information from the second external terminal, the generation unit notifies the second external terminal of information representing that the first network has been started.

14. The wireless communication terminal according to claim 13, wherein the information representing that the first network has been started includes identification information used for identifying the first external terminal.

15. A wireless communication system, comprising:
the wireless communication terminal according to claim 1 and
an external terminal transmitting a connection request and terminal-specifying information to the wireless communication terminal by using a first communication protocol, the external terminal connecting to the network started by the wireless communication terminal based on the network identifier.

16. A wireless communication method between a wireless communication terminal and an external terminal, the wireless communication terminal including a first communication module and a second communication module, the first communication module performing wireless communication with the external terminal by using a first communication protocol, and the second communication module performing wireless communication with the external terminal by using a second communication protocol, the wireless communication method comprising:
a transmitting step of transmitting a connection request requesting a connection and terminal-specifying information specifying the external terminal to the wireless communication terminal according to the first communication protocol, the transmitting step being performed by the external terminal;
a generating step of generating a network identifier used for identifying a network using the second communication protocol based on terminal-specifying information, in a situation in which the wireless communication terminal receives the connection request and the terminal-specifying information from the external terminal via the first communication module by using the first communication protocol, the connection request and the terminal-specifying information being transmitted during the transmitting step, and the generating step being performed by the wireless communication terminal;
a start-up step of causing the second communication module to establish a logical link of communication with the external terminal by using the network identifier generated in the generating step and subsequently causing the second communication module to start the network based on the network identifier such that the network is in a communicable state for the external terminal on a higher layer than a layer in which the logical link of the communication is established, the start-up step being performed by the wireless communication terminal; and
a connecting step of connecting the external terminal to the network based on the network identifier by using the second communication protocol, the connecting step being performed by the external terminal.

17. A non-transitory medium saving program causing a computer as a wireless communication terminal including a first communication module performing wireless communication with an external terminal by using a first communication protocol and a second communication module performing wireless communication with an external terminal by using a second communication protocol to execute: a generating step of generating a network identifier used for identifying a network using the second communication protocol based on terminal-specifying information, in a situation in which the first communication module receives a connection request requesting a connection and terminal-specifying information used for specifying an external terminal from the externa terminal by using the first communication protocol; and a start-up step of causing the second communication module to establish a logical link of communication with the external terminal by using the network identifier, which is generated in the generation of a network identifier, and subsequently starting the network based on the network identifier on a higher layer than a layer in which the logical link of the communication is established such that network is in a communicable state for the external terminal.

* * * * *